(12) United States Patent
Copeland, Jr. et al.

(10) Patent No.: US 10,978,922 B2
(45) Date of Patent: *Apr. 13, 2021

(54) ELECTROMAGNETIC GENERATOR TRANSFORMER

(71) Applicant: Prototus, Ltd., San Pedro Town (BZ)

(72) Inventors: Carl E. Copeland, Jr., Burleson, TX (US); Babak Fahimi, Arlington, TX (US)

(73) Assignee: Prototus, Ltd., San Pedro Town (BZ)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,650

(22) Filed: Apr. 1, 2019

(65) Prior Publication Data

US 2020/0036238 A1    Jan. 30, 2020

Related U.S. Application Data

(63) Continuation of application No. 15/147,379, filed on May 5, 2016, now Pat. No. 10,250,086, which is a
(Continued)

(51) Int. Cl.
*H02K 1/14* (2006.01)
*H02K 1/18* (2006.01)
(Continued)

(52) U.S. Cl.
CPC ............. *H02K 1/143* (2013.01); *H02K 1/187* (2013.01); *H02K 7/1823* (2013.01); *H02K 21/44* (2013.01); *H02K 7/1876* (2013.01)

(58) Field of Classification Search
CPC ............ H02K 1/06; H02K 1/187; H02K 7/09; H02K 7/18; H02K 19/34; H02K 21/227;
(Continued)

(56) References Cited

U.S. PATENT DOCUMENTS

| 2,460,921 A | 2/1949 | Candy |
| 3,419,739 A | 12/1968 | Clements |

(Continued)

FOREIGN PATENT DOCUMENTS

| CN | 1050956 | 4/1991 |
| CN | 1083277 | 3/1994 |

(Continued)

OTHER PUBLICATIONS

Chinese Office Action regarding Chinese Patent Application 201810606563.3, dated Sep. 24, 2019.
(Continued)

*Primary Examiner* — Tran N Nguyen
(74) *Attorney, Agent, or Firm* — Dunlap Codding, P.C.

(57) ABSTRACT

An electromagnetic generating transformer comprises one or more flux assembly having one or more magnetic field source having a positive pole and a negative pole and a magnetic field passing in a path between the positive pole and the negative pole and a conductor magnetically coupled with the one or more magnetic field source, the magnetic field source and the conductor being fixed relative to one another; a shunt is coupled with a motive source and configured to move the shunt into a primary position and a secondary position, wherein the magnitude of the magnetic field passing between the positive pole and the negative pole varies when the shunt is moved between the primary position and the secondary position.

4 Claims, 15 Drawing Sheets

Related U.S. Application Data continuation of application No. 13/834,086, filed on Mar. 15, 2013, now Pat. No. 9,461,508.

(60) Provisional application No. 61/653,269, filed on May 30, 2012.

(51) Int. Cl.
  H02K 7/18 (2006.01)
  H02K 21/44 (2006.01)

(58) Field of Classification Search
  CPC ........ H02K 21/38; H02K 21/48; H02K 23/00; H02K 21/40; H02K 55/00
  USPC ................ 310/216.023, 216.092, 68 B, 68 R
  See application file for complete search history.

(56) References Cited

U.S. PATENT DOCUMENTS

| | | | |
|---|---|---|---|
| 3,431,444 | A | 3/1969 | Wilson |
| 3,689,861 | A | 9/1972 | Gibson |
| 3,983,430 | A | 9/1976 | Howard |
| 4,639,626 | A | 1/1987 | McGee |
| 4,757,224 | A | 7/1988 | McGee et al. |
| 6,140,730 | A | 10/2000 | Tkaczyk et al. |
| 6,373,162 | B1 | 4/2002 | Liang et al. |
| 6,750,588 | B1 | 6/2004 | Gabrys |
| 7,425,772 | B2 | 9/2008 | Novo Vidal |
| 9,461,508 | B2 * | 10/2016 | Copeland, Jr. ......... H02K 21/44 |
| 10,250,086 | B2 * | 4/2019 | Copeland, Jr. ......... H02K 1/187 |
| 2004/0041409 | A1 | 3/2004 | Gabrys |
| 2005/0116569 | A1 | 6/2005 | Fahy |
| 2006/0128231 | A1 | 12/2006 | Fahy |
| 2006/0290224 | A1 | 12/2006 | Sabater Perez |
| 2010/0109452 | A1 | 5/2010 | Calley et al. |
| 2011/0025158 | A1 | 2/2011 | Aiki et al. |

FOREIGN PATENT DOCUMENTS

| | | |
|---|---|---|
| CN | 101409488 A | 4/2009 |
| CN | 101501963 A | 8/2009 |
| EP | 0199496 | 10/1986 |
| EP | 0932167 | 7/1999 |
| JP | 08-084454 | 3/1996 |
| JP | 08-251894 | 9/1996 |
| JP | 2000069732 | 3/2000 |
| JP | 2005-168190 | 6/2005 |
| JP | 2007-067252 | 3/2007 |
| JP | 200817578 | 1/2008 |
| WO | 2006/128231 | 12/2006 |
| WO | 2009/091248 | 7/2009 |
| WO | 2011/033370 | 3/2011 |
| WO | 2011/040982 | 4/2011 |

OTHER PUBLICATIONS

Brazilian Search Report and Written Opinion regarding Brazilian Patent Application No. BR1120140300143, dated Dec. 17, 2019.
Canadian Office Action regarding Canadian Patent Application 2,874,754, dated Feb. 28, 2019.
201180059316.2 English Translation of the First Office Action, 9 pgs.
Canadian Application No. 2,820,015 Office Action, dated Jul. 31, 2014, 5 pgs.
PCT/US2011/062063 Preliminary Report on Patentability dated Jun. 20, 2013, 7 pgs.
Canadian Application No. 2,820,015 Office Action, dated Jul. 29, 2015, 7 pgs.
European Search Report for EP 13797505.8, dated Apr. 1, 2016.
Chinese Office Action regarding Chinese Patent Application 201810606563.3, dated Aug. 18, 2020.

* cited by examiner

ELECTROMAGNETIC GENERATOR TRANSFORMER

INCORPORATION BY REFERENCE

The present patent application is a continuation of U.S. Ser. No. 15/147,379, filed May 5, 2016, which is a continuation of U.S. Ser. No. 13/834,086, filed Mar. 15, 2013, now U.S. Pat. No. 10,250,086, which claims priority to the provisional application identified by U.S. Ser. No. 61/653,269, filed on May 30, 2012, the entire content of all of which are hereby incorporated herein by reference.

FIELD OF INVENTIVE CONCEPTS

The inventive concepts disclosed herein generally relate to electromagnetic generator transformers, and more particularly, but not by way of limitation, to generators of electrical energy having one or more magnetic field source and an inductive coil (or conductor) magnetically coupled therewith, the magnetic field source and the coil being stationary relative to one another. An ancillary process other than movement of the inductive coil and the magnetic field source relative to one another is used to vary the magnetic field of the magnetic field source, thus inducing electrical current in the coil.

BACKGROUND

Electromagnetic generators are well known in the prior art. Broadly, prior art electromagnetic generators generate electricity by varying a magnetic field, which induces electrical current in an adjacent coil. The magnetic field source has traditionally been a permanent magnet, but electromagnets have also been used.

The prior art devices typically use a magnetic field source, which is disposed adjacent to a coil, such that a small air gap separates the two. Several such pairs of magnetic field sources and coils may be used in a single device to increase efficiency. Most prior art devices operate by either moving the magnetic field source relative to the coil, or by moving the coil relative to the magnetic field source to generate magnetic field fluctuations (also referred to as "magnetic flux" or "flux"), and thereby induce electrical current into the coils. To that end most prior art devices use a stator and a rotor, the stator housing the stationary component and the rotor moving the other component relative to the stationary one.

Additionally, there are several prior art devices that utilize a magnetic field blocking device to generate a changing flux within windings to generate electricity. The magnetic field blocking device is typically a magnetic field impermeable disk which has magnetic field permeable portions cut out in tooth-like or window-like configurations. The disk is disposed in the air gap between the magnetic field source and the coil. The flux-blocking disk is rotated in such a way as to alternatively allow axial flux to pass through from the magnetic field source to the coil, or to redirect the axial flux away from the coil. Alternatively, the flux-blocking disk is held stationary, and one of the coils or magnetic field source are rotated. For examples of such prior art devices see U.S. Pat. Nos. 3,431,444, 3,983,430, 4,639,626, and 6,140,730.

However, prior art devices suffer from a number of deficiencies, such as heavy and expensive to manufacture rotors, heavy stators, and low efficiency, among others.

Accordingly, there exists a need for a more efficient generator of electrical energy. The inventive concepts disclosed herein are directed to such a generator of electrical energy having fixed magnetic field source and conductor, and using an ancillary process other than movement of the magnetic field source and the conductor relative to one another, to vary the strength or polarity of the flux in the magnetic field of the magnetic field source, and thereby induce electrical current in the conductor.

SUMMARY

In one aspect, the inventive concepts disclosed herein are directed to an electromagnetic generating transformer, comprising: (1) one or more flux assembly having one or more magnetic field source having a positive pole and a negative pole and a magnetic field passing in a path between the positive pole and the negative pole; (2) a conductor magnetically coupled with the one or more magnetic field source, the magnetic field source and the conductor being fixed relative to one another; (3) a shunt; and (4) a motive source coupled with the shunt and configured to move the shunt into a primary position and a secondary position, wherein a strength of the magnetic field passing between the positive pole and the negative pole varies when the shunt is moved between the primary position and the secondary position. The shunt may be magnetically permeable, and may include one or more magnetic field permeable segment alternating with one or more magnetic field impermeable segment.

In another aspect, the inventive concepts disclosed herein are directed to an electromagnetic generating transformer, comprising: (1) one or more flux assembly having one or more magnetic field source having a positive pole and a negative pole and a magnetic field passing in a path between the positive pole and the negative pole; (2) a conductor magnetically coupled with the one or more magnetic field source, the magnetic field source and the conductor being fixed relative to one another; (3) a shunt at least partially positioned in the path between the positive pole and the negative pole, and having a first magnetic permeability and a second magnetic permeability; and (4) a controller operably coupled with the shunt and influencing the shunt's magnetic permeability to switch the magnetic permeability of the shunt from the first magnetic permeability to the second magnetic permeability. The shunt may be stationary or movable relative to the magnetic field source.

In yet another aspect, the inventive concepts disclosed herein are directed to an electromagnetic generating transformer, comprising: (1) one or more flux assembly having one or more magnetic field source having a positive pole and a negative pole and a magnetic field passing in a path between the positive pole and the negative pole; (2) a conductor magnetically coupled with the one or more magnetic field source, the magnetic field source and the conductor being fixed relative to one another; (3) a magnetic control device operably coupled with the magnetic field source; and (4) a controller operably coupled with the magnetic control device and configured to cause the magnetic control device to change at least one of a strength and a polarity of the magnetic field of the one or more magnetic field source. The conductor can be at least partially positioned in the path between the positive pole and the negative pole. The electromagnetic generating transformer may also include a second conductor magnetically coupled with the one or more magnetic field source. The one or more magnetic field source may include a magnetostrictive material, and the magnetic control device may be configured to apply mechanical force to the one or more magnetic field source.

The one or more magnetic field source may include a superconductor material, and the magnetic control device may be configured to apply thermal energy to the one or more magnetic field source. The thermal energy may include an optical signal.

BRIEF DESCRIPTION OF THE DRAWINGS

Like reference numerals in the figures represent and refer to the same element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION

Figure 1:
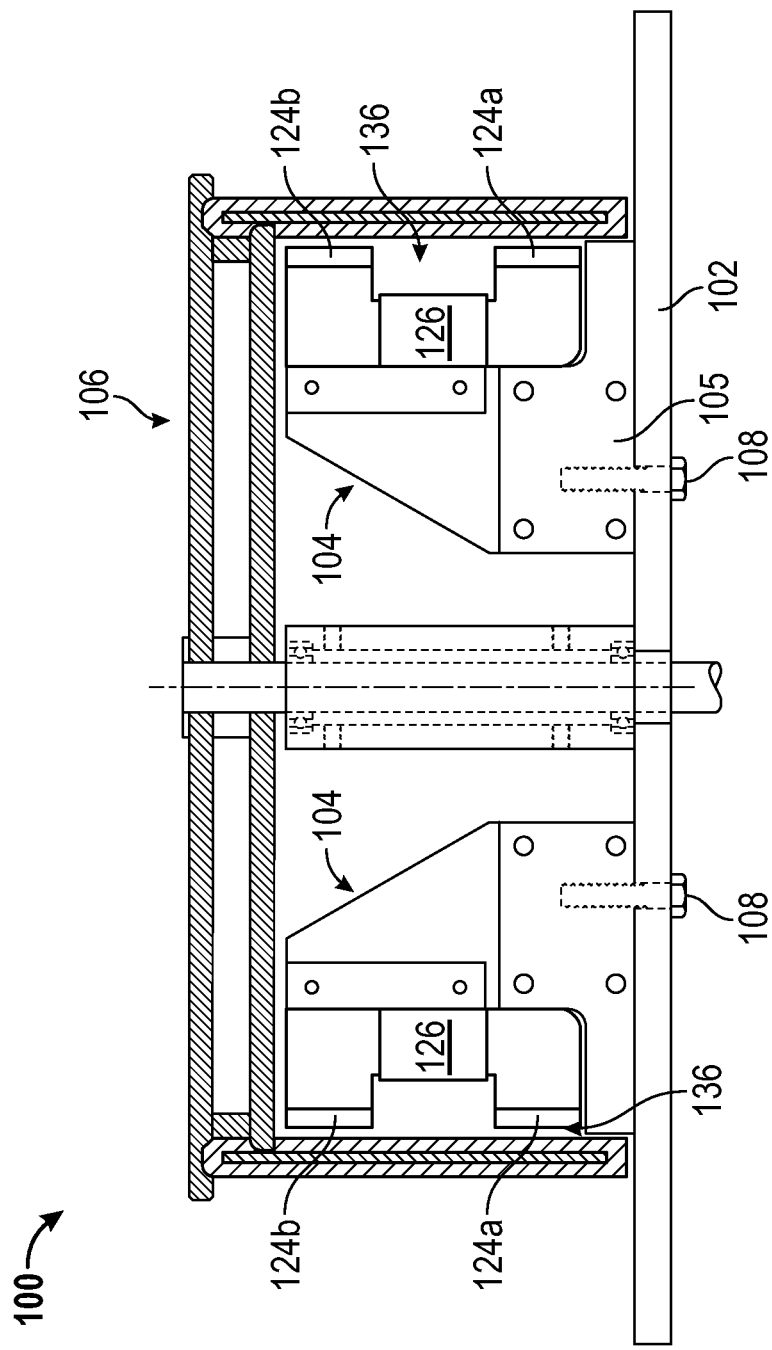
FIG. 1 is a cross-sectional view of an exemplary embodiment of a generator of electrical energy according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting.

In the following detailed description of embodiments of the instant disclosure, numerous specific details are set forth in order to provide a more thorough understanding of the inventive concepts disclosed herein. However, it will be apparent to one of ordinary skill in the art that the inventive concepts disclosed herein may be practiced without these specific details. In other instances, well-known features have not been described in detail to avoid unnecessarily complicating the instant disclosure.

As used herein the notation "a-n" appended to a reference numeral is intended as merely convenient shorthand to reference one, or more than one, and up to infinity, of the element or feature identified by the respective reference numeral (e.g., 100a-n). Similarly, a letter following a reference numeral is intended to reference an embodiment of the feature or element that may be similar, but not necessarily identical, to a previously described element or feature bearing the same reference numeral (e.g., 100, 100a, 100b, etc.). Such shorthand notations are used for purposes of clarity and convenience only, and should not be construed to limit the inventive concepts disclosed herein in any way, unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

As used herein the terms "axial," "axially," and any variations thereof, are intended to include extending substantially parallel to, or along the same general line or direction as, an axis of rotation. Further, as used herein the terms "radial," "radially," and any variations thereof are intended to include extending substantially along a radius, or a line substantially perpendicular to an axis of rotation or to a center.

As used herein the terms "air gap," "gap," and any variations thereof shall be understood to include a distance separating two or more objects or surfaces, regardless of whether a gas or fluid is present or absent between the objects or surfaces, unless expressly stated to the contrary.

As used herein the qualifiers "about" and "substantially" are intended to include not only the exact amount, orientation, amount, value, or degree qualified, but are intended to include some small variations due to measurement error, manufacturing tolerances, stresses exerted on the component or structure, and combinations thereof, for example.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein are directed to a generator of electrical energy. Broadly, a generator according to exemplary embodiments of the inventive concepts disclosed herein may comprise an assembly, one or more flux assembly, and a source of motive force. The assembly has one or more magnetic field permeable segment alternating with one or more magnetic field impermeable segment, the assembly being guided and movable through a predetermined travel path. The one or more flux assembly has one or more magnetic field source having a magnetic field extending at least partially into the predetermined travel path, and a coil magnetically coupled with the one or more magnetic field source. The motive source is connected to the assembly for moving the assembly through the predetermined travel path whereby the movement of the one or more magnetic field permeable segment and the one or more magnetic field impermeable segment of the assembly through the predetermined travel path changes the magnetic coupling between the coil and the one or more magnetic field source inducing electrical current in the coil. The terms "magnetic permeable", "magnetic field permeable", "magnetic impermeable", "magnetic field impermeable" and the like are intended to refer to a difference in the amount of magnetic permeability between the materials forming the "permeable" and "impermeable" segments.

In an alternative embodiment, the one or more flux assembly is movable through a predetermined travel path, rather than or in addition to the assembly. In this embodiment, the one or more flux assembly is guided and movable such that the flux assembly and the magnetic field travel through the predetermined travel path. The assembly having the one or more magnetic field permeable segment alternating with one or more magnetic field impermeable segment is positioned such that the magnetic field traveling through the predetermined travel path at least partially intersects the one or more magnetic field permeable segment and the one or more magnetic field impermeable segment. The motive source is connected to the one or more flux assembly for moving the one or more flux assembly and the magnetic field through the predetermined travel path.

In the examples described herein, the assembly having the one or more magnetic field permeable segment alternating with one or more magnetic field impermeable segment is referred to as a "drum assembly." However, it should be understood that the assembly can have shapes other than a drum shape. For example, the assembly could be a linear shaped assembly, an elliptical shaped assembly, a square or box shaped assembly, a triangular shaped assembly, or a flexible assembly that can be shaped by guides such that the flexible assembly can be guided through a predetermined path having any suitable shape. For example, the flexible assembly can be in the form of a conveyor belt having alternating sections magnetic field permeable segments and magnetic field impermeable segments.

Referring now to the drawings and in particular to FIG. 1, an exemplary embodiment of a generator 100 according to the inventive concepts disclosed herein is shown as having a base plate 102, one or more flux assembly 104 attached to the base plate 102, and a drum assembly 106 supported by the base plate 102 and rotatable around and/or adjacent to the one or more flux assembly 104. The one or more flux assembly 104 can be inside and/or outside the drum assembly 106. The one or more flux assembly 104 and the drum assembly 106 may be attached to, or mounted onto, the base plate 102 via base bolts 108, although other mounting methods can be used such as welds, screws, joints, adhesives, brackets, shims, gussets, and combinations thereof, for example. One or more magnetic-field permeable or magnetic field impermeable components (not shown) may be positioned between, or used to connect the one or more flux assembly 104 and the base plate 102, such as a spacer, an insert, a shim, an adjustable mounting bracket 105, a washer, a clamp, and combinations thereof, for example.

In some embodiments of the inventive concepts disclosed herein, the generator 100 may also have an optional protective housing (not shown) adapted to protect the components of the generator 100 from water, dust, debris, tampering, and other environmental factors, for example. The protective housing (not shown) may be implemented as any conventional generator housing and may be constructed of plastics, metals, alloys, non-metals, and other suitable materials and combinations thereof, for example. The implementation of the protective housing may be varied depending on the material used and/or the operational and environmental variables expected to be encountered by the generator 100, for example.

Figure 2:
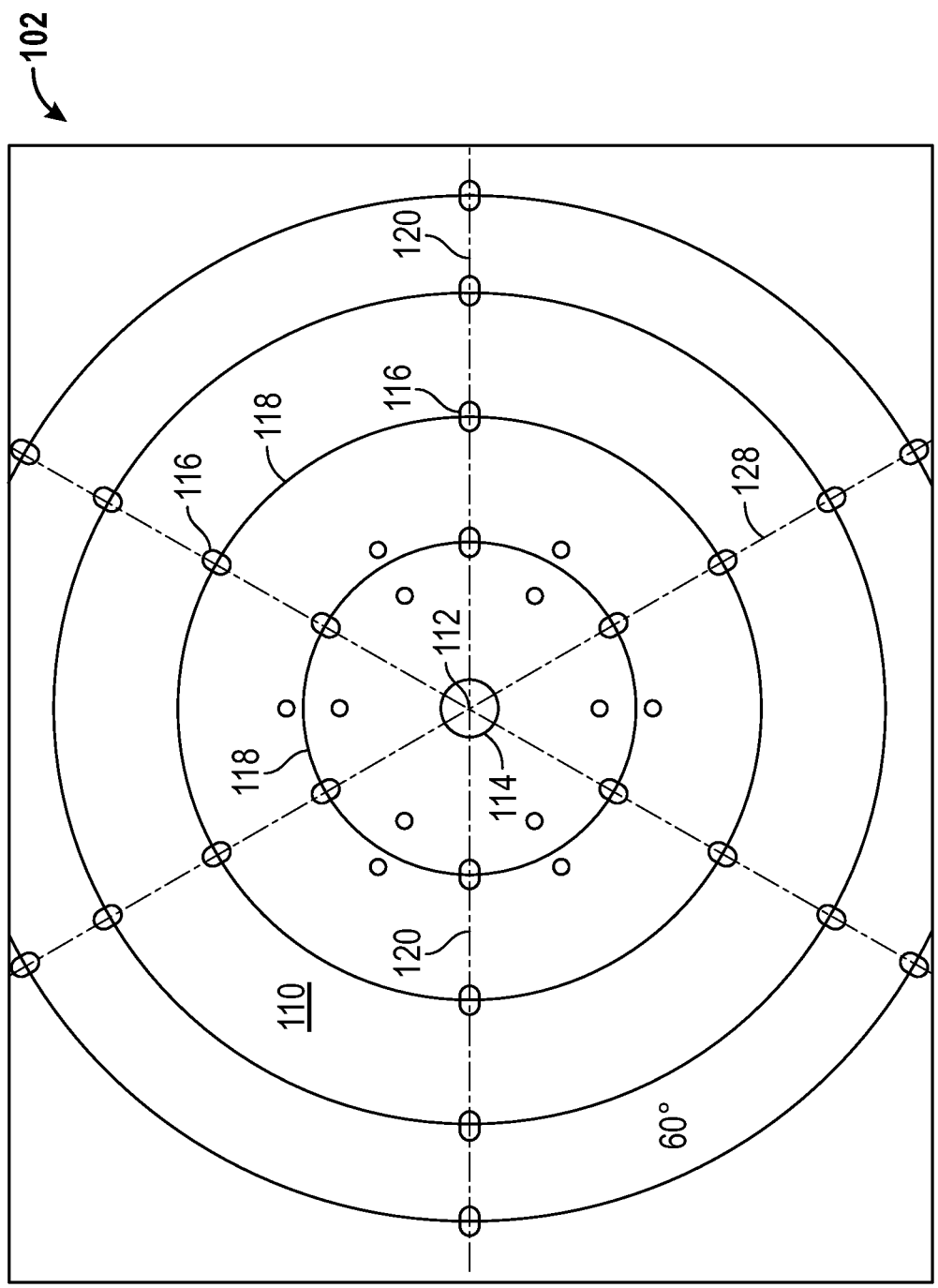
FIG. 2 is a plan view of a base plate according to the inventive concepts disclosed herein.
Figure 3:
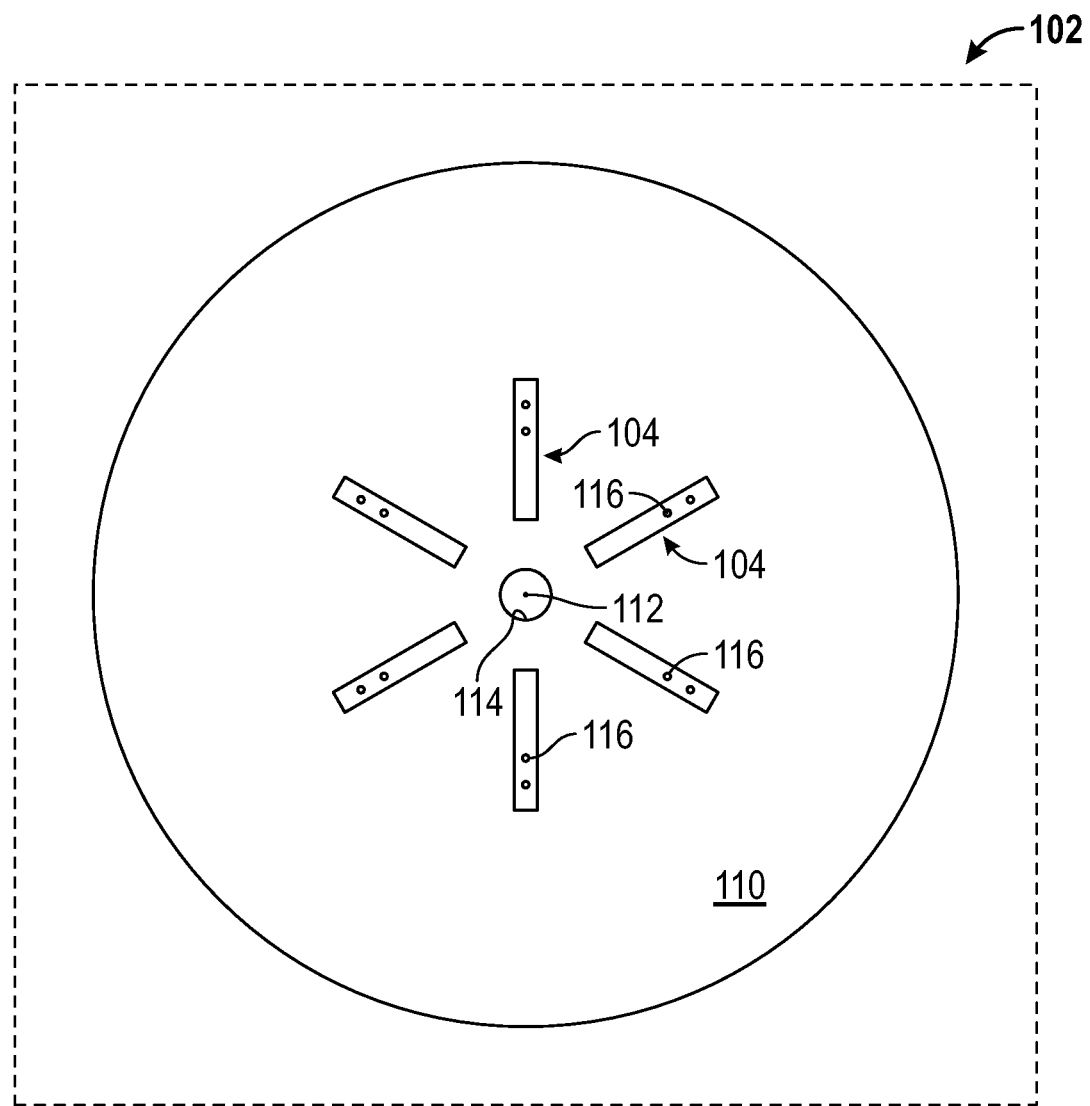
FIG. 3 is a top plan view of the base plate of FIG. 2.

Referring now to FIGS. 2-3, the base plate 102 may define a substantially horizontal disk-shaped flat surface 110 having a center 112. It is to be understood that in some exemplary embodiments of the inventive concepts disclosed herein the surface 110 may have any desired shape, curvature, and dimensions as will be understood by persons or ordinary skill in the art having the benefit of the instant disclosure.

The surface 110 may have a central opening 114 positioned coaxially with the center 112, and one or more apertures 116 positioned at a first distance from the center 112. The central opening 114 may be adapted to receive a shaft of the drum assembly 106 therethrough as will be described below. The surface 110 of the base plate 102 can be about 24 inches in diameter, but it is to be understood that the dimensions of the base plate 102 can be varied depending on the material used for the manufacture of the base plate 102 and/or the operational and environmental variables expected to be encountered by the generator 100.

The one or more apertures 116 may be arranged along the surface 110 in such a way as to define one or more concentric rings 118, and may be aligned as to form one or more radial lines 120 separated by about 60 degrees, or by about 72 degrees along the surface 110, for example. In some exemplary embodiments the one or more apertures 116 can be adapted to receive one or more base bolts 108, in order to affix the drum assembly 106 and/or the one or more flux assembly 104 to the base plate 102 as will be described below. It is to be understood that the shape, size, organization, arrangement, and number of the one or more apertures 116 can vary.

The base plate 102 can be constructed of a thermoset plastic laminate material such as a material of the type sold under the name Garolite G-10, but acrylic plastics such as Plexiglas™, or any other material of suitable strength and durability can be used. The base plate 102 may be constructed of non-conductive and/or non-ferrous materials to limit the potential of eddy currents being induced within the generator 100.

The base plate 102 can function to structurally support the various components of the generator 100. The base plate 102 can define a part of an external housing (not shown) protecting the generator 100 from environmental variables. Alternatively, the generator 100 can be completely or partially enclosed by a separate protective housing (not shown), for example. It should be understood that the base plate 102 can have any size or shape, as long as it allows for the placement and structural support of the one or more flux assembly 104 such as adjacent to a concentric coaxial orientation of the drum assembly 106.

For the purposes of clarity, the base plate 102 may be arbitrarily referenced hereinafter as oriented horizontally, and the orientations of the one or more flux assembly 104 and the drum assembly 106 may be discussed relative to a horizontally oriented base plate 102. It is to be understood however, that such orientation designations refer only to the orientation of the various components of the generator 100 one relative to another, and do not necessarily relate to any external object, position, direction, or orientation. Such designations are utilized for purposes of clarity and convenience only, and are not to be regarded as limiting the inventive concepts disclosed herein in any way.

Figure 4:
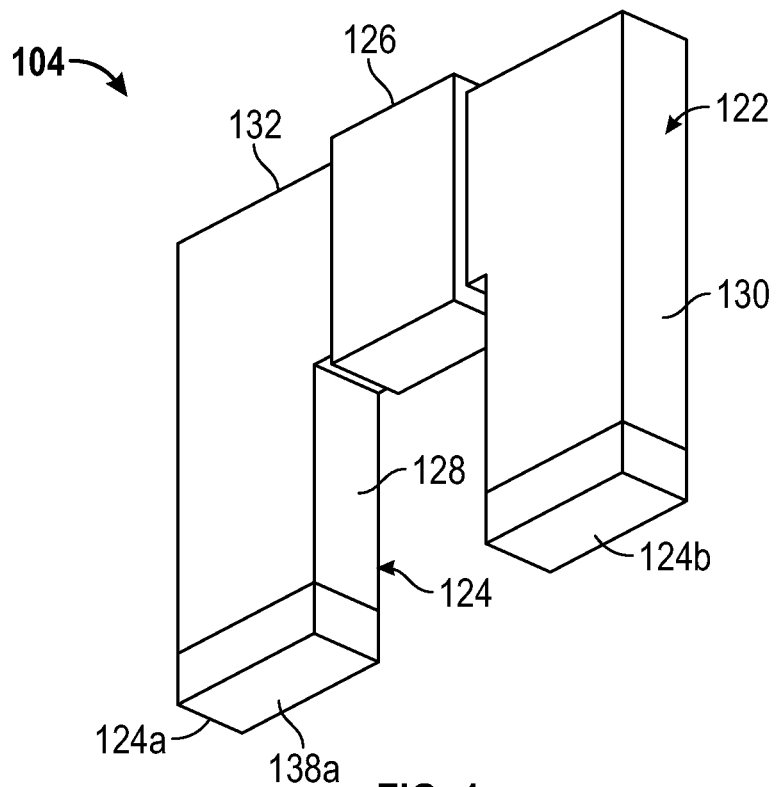
FIG. 4 is a perspective view of a flux assembly according to the inventive concepts disclosed herein.
Figure 5:
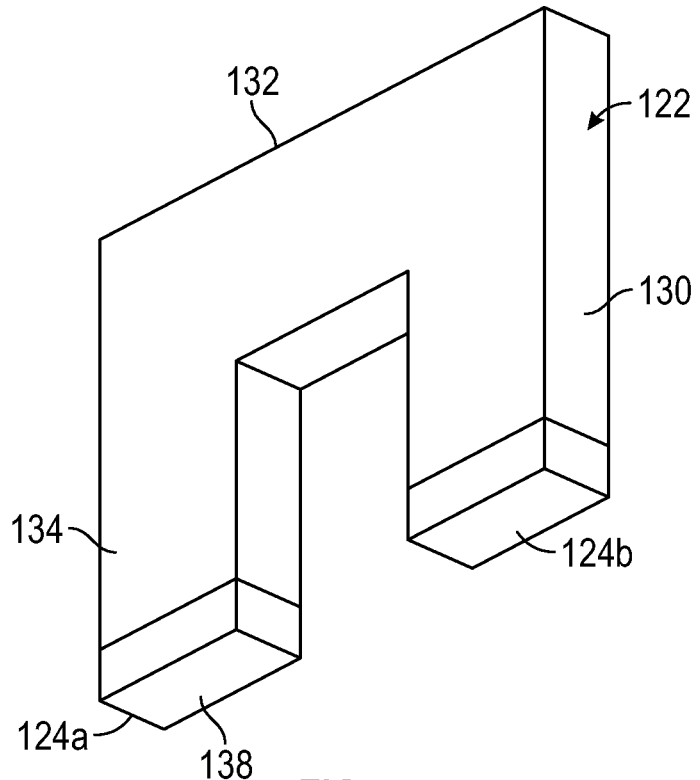
FIG. 5 is a perspective view of a flux base according to the inventive concepts disclosed herein.
Figure 6:
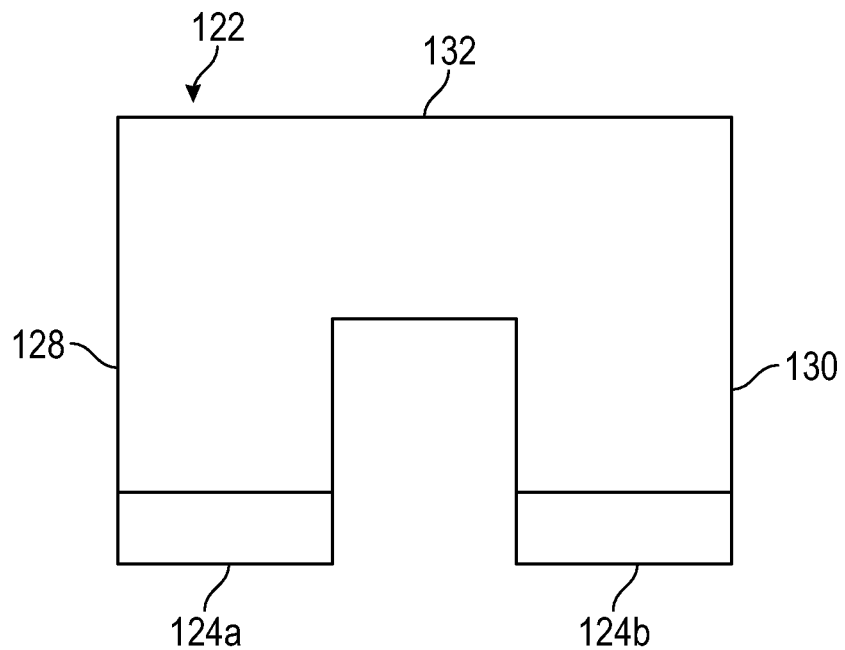
FIG. 6 is a plan view of the flux base of FIG. 5.
Figure 7:
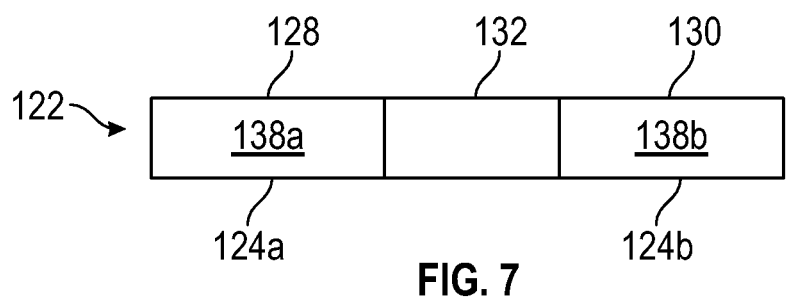
FIG. 7 is a bottom plan view of the flux base of FIG. 5.
Figure 8:
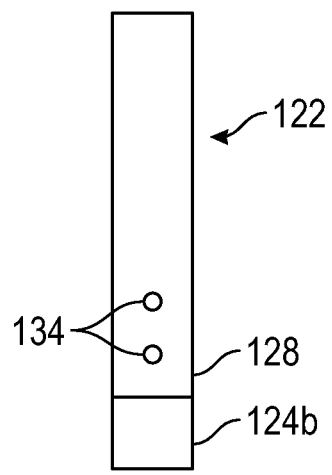
FIG. 8 is a side view of the flux base of FIG. 5.

Referring now to FIG. 4, the one or more flux assembly 104 comprises a flux base 122, a first magnetic field source 124*a* and a second magnetic field source 124*b* magnetically coupled with a coil 126 such that a unitary magnetic field source 124 is formed by the flux base 122, the first magnetic field source 124*a*, the second magnetic field source 124*b*, and the coil 126. The unitary magnetic field source 124 may function as a permanent magnet in some exemplary embodiments of the inventive concepts disclosed herein.

Referring now to FIGS. 5-9, the flux base 122 is shown as being substantially U-shaped and having a bottom arm 128, a top arm 130, and a connecting portion 132. The bottom arm 128, the top arm 130, and the connecting portion 132 may be magnetically coupled or connected with one another.

The bottom arm 128 may have one or more base apertures 134 adapted to align with the one or more apertures 116 and to threadingly receive one or more base bolts 108 therein, in order to mount the flux base 122 onto the base plate 102. The bottom arm 128 of the flux base 122 may have a substantially flat rectangular surface to ensure that the flux base 122 fits flush with the surface 110 of the base plate 102, such that the flux base 122 is extending substantially vertically from the surface 110 of the base plate 102 although other configurations can be used. It is to be understood that the flux base 122 can be attached to the surface 110 by any suitable means known in the art, such as screws, rivets, welds, adhesives, adjustable mounting brackets, supports, and combinations thereof, for example. In some exemplary embodiments of the inventive concepts disclosed herein, an optional adjustable mounting bracket 105 (FIG. 1) may be implemented to attach the one or more flux assembly 104 to the base plate 102, such that the position of the one or more flux assembly 104 may be adjusted relative to the base plate 102, to increase, decrease, or otherwise adjust the position of the one or more flux assembly 104 relative to the drum assembly 106. The adjustable mounting bracket 105 (FIG. 1) may be adjusted by inserting lockdown bolts through adjustment slots which allow the adjustable mounting bracket to slide when the lockdown bolts are loosened, and secure the adjustable mounting bracket 105 in any desired position when the lockdown bolts are tightened, for example. An adjustment rod (not shown) that biases the flux base 122 against a spring (not shown), for example, may be implemented to move the flux base 122 in any desired position prior to tightening the lockdown bolts. In other embodiments of the inventive concepts disclosed herein, the adjustable mounting bracket 105 (FIG. 1) may be incrementally adjustable, such as by securing the adjustable mounting bracket 105 in one or more adjacent apertures 116, for example. It is to be understood that in some exemplary embodiments, the one or more flux assembly 104 may be adjustable relative to the base plate 102 via the adjustable mounting bracket 105, and in some exemplary embodiments the flux base 122 may be adjustable relative to the one or more flux assembly 104 via the adjustable mounting bracket, while the one or more flux assembly 104 is maintained substantially stationary relative to the base plate 102, and combinations thereof. The adjustability provided by the adjustable mounting bracket 105 may be used to adjust the size of the air gap 136 separating the one or more flux assembly 104 and the drum assembly 106 as will be described below, for example.

Alternatively, the flux base 122 and the base plate 102 may be formed as a single piece, or another element (not shown) may be used to connect the flux base 122 to the base plate 102.

In other exemplary embodiments, the flux base 122 may be implemented as a unitary U-shaped magnetic field source 124, and the bottom arm 128, the top arm 130, and the connecting portion 132 may likewise be incorporated into the unitary U-shaped unitary magnetic field source 124.

The flux base 122 is desirably made from a magnetically conductive material, such as laminated steel, to form a unitary magnetic field source having a common magnetic core shared by the first magnetic field source 124*a*, the second magnetic field source 124*b*, and the coil 126 as will be described herein below, for example. In some exemplary embodiments the first magnetic field source 124*a* or the second magnetic field source 124*b* may be omitted.

The flux base 122 is shown as being substantially U-shaped and may be about 1 inch thick, but it is to be understood that the dimensions of the flux base 122 can be varied depending on the material used for its manufacture and/or the operational and environmental variables expected to be encountered by the generator 100, for example.

The coil 126 may be wound, or mounted, about one or more of the bottom arm 128, top arm 130, and connecting portion 132 of the flux base 122 and can be implemented as any conventional coil 126 into which an electrical current may be induced by a magnetic field. The coil 126 can have any type or number of windings, cores, and/or poles, as long as the coil 126 is capable of receiving a magnetic flux from the first magnetic field source 124*a* and the second magnetic field source 124*b*, such that one or more electrons in the coil 126 may be forced to flow through an electrical circuit (not shown) which may be external to the coil 126, for example.

The first magnetic field source 124*a* may be magnetically coupled to the bottom arm 128 and the second magnetic field source 124*b* may be magnetically coupled to the top arm 130, for example. The first magnetic field source 124*a* and the second magnetic field source 124*b* may be magnetically coupled with the bottom arm 128 and the top arm 130 in any suitable manner, such as bolts, screws, joints, welds, brackets, clamps, adhesives, seems, press-fitting, molding, soldering, and combinations thereof, for example. Further, one or more magnetic-field permeable components such as brackets, mounts, spacers, shunts, coils, shims, gussets, washers, and combinations thereof, may be used to magnetically couple the first magnetic field source 124*a* to the bottom arm 128 and/or the second magnetic field source 124*b* to the top arm 130, for example.

The first magnetic field source 124*a* may behave as a North or South pole, and the second magnetic field source 124*b* may behave as the opposite respective South or North pole of the flux base 122, for example, of a unitary magnetic field source 124.

The first magnetic field source 124*a* and the second magnetic field source 124*b* can be oriented such that the first magnetic field source 124a and the second magnetic field source 124b are aligned along a line perpendicular to the surface 110 and radially offset from the center 112, for example. The first magnetic field source 124a and the second magnetic field source 124b may be oriented relative to the surface 110 as follows: the first magnetic field source 124a may behave as the North pole of the unitary magnetic field source 124 and be relatively closer to the surface 110 and the second magnetic field source 124b may behave as the South pole of the unitary magnetic field source 124 and be relatively further to the surface 110, resulting in a N-S arrangement of the poles of the unitary magnetic field source 124 in a direction vertically away from the surface 110, for example. Alternatively, the first magnetic field source 124a may behave as the South pole of the unitary magnetic field source 124 and the second magnetic field source 124b may behave as the North pole of the unitary magnetic field source 124, resulting in a S-N arrangement of the poles of the unitary magnetic field source 124 in a direction vertically away from the surface 110, for example. As would be understood by one skilled in the art, flux lines leave the South pole, e.g., the first magnetic field source 124a and travel through the magnetic field source 124 to the second magnetic field source 124b where the flux lines travel through the air gap to the South pole, e.g., the first magnetic field source 124a to complete a magnetic circuit.

The first magnetic field source 124a and the second magnetic field source 124b may be implemented as any permanent magnets or electromagnets, and can be made of any suitable material, such as isotropic or anisotropic, and combinations thereof, for example. The first magnetic field source 124a and the second magnetic field source 124b can be of any strength, and can have varying sizes and shapes depending on the size and output requirements of the generator 100. The first magnetic field source 124a and the second magnetic field source 124b can be arranged in any configuration consistent with defining at least a part of an air gap 136 (FIG. 1) between the one or more flux assembly 104 and the drum assembly 106, and may be in magnetic communication with the coil 126 via the flux base 122, for example. An exposed surface 138a of the first magnetic field source 124a and an exposed surface 138b of the second magnetic field source 124b may have a slight curvature such that the size of the air gap 136 may be minimized, for example. A magnetic field desirably extends between the exposed surface 138b and the exposed surface 138b, such that at least a portion of the drum 146 is positioned into the magnetic field extending between the exposed surface 138a and the exposed surface 138b of the unitary magnetic field source 124 as will be described below.

Alternatively, the one or more flux assembly 104 may include more than two magnetic field sources 124a-n, or may have a unitary magnetic field source 124 which forms the magnetic core of the coil 126, for example.

In some exemplary embodiments, the generator 100 may comprise five flux assemblies 104 mounted onto the base plate 102 such that the five flux assemblies 104 are symmetrically disposed about the disk-shaped surface 110 defined by the base plate 102. The distance between any two of the five flux assemblies 104 may be substantially equal to the distance between any other two flux assemblies 104, for example, resulting in the five flux assemblies 104 being separated by about 63.3° along the disk-shaped surface 110 of the base plate 102 and extending radially from the center 112 thereof. It is to be understood that the distance between any two of the five flux assemblies 104 may be different from the distance between any other two flux assemblies 104, resulting in the five flux assemblies being un-symmetrically disposed about the disk shaped surface 110, for example. In other exemplary embodiments, the generator 100 may comprise six flux assemblies 104 mounted onto the base plate 102 such that the flux assemblies 104 are symmetrically disposed about the disk-shaped surface 110 defined by the base plate 102. The distance between any two of the six flux assemblies 104 may be substantially equal to the distance between any other two flux assemblies 104, for example, resulting in the six flux assemblies 104 being separated by about 60° along the disk-shaped surface 110 of the base plate 102 and extending radially from the center 112 thereof. It is to be understood, however, that a different number of flux assemblies 104 can be used with the inventive concepts disclosed herein without departing from the scope of the inventive concepts disclosed herein.

As will be appreciated by persons of ordinary skill in the art having the benefit of the instant disclosure, any number of flux assemblies 104 may be implemented with the inventive concepts disclosed herein, and such flux assemblies 104 may be oriented in any direction along the disk-shaped surface 110, and may be arranged symmetrically or un-symmetrically about the disk-shaped surface 110, for example.

Figure 9:
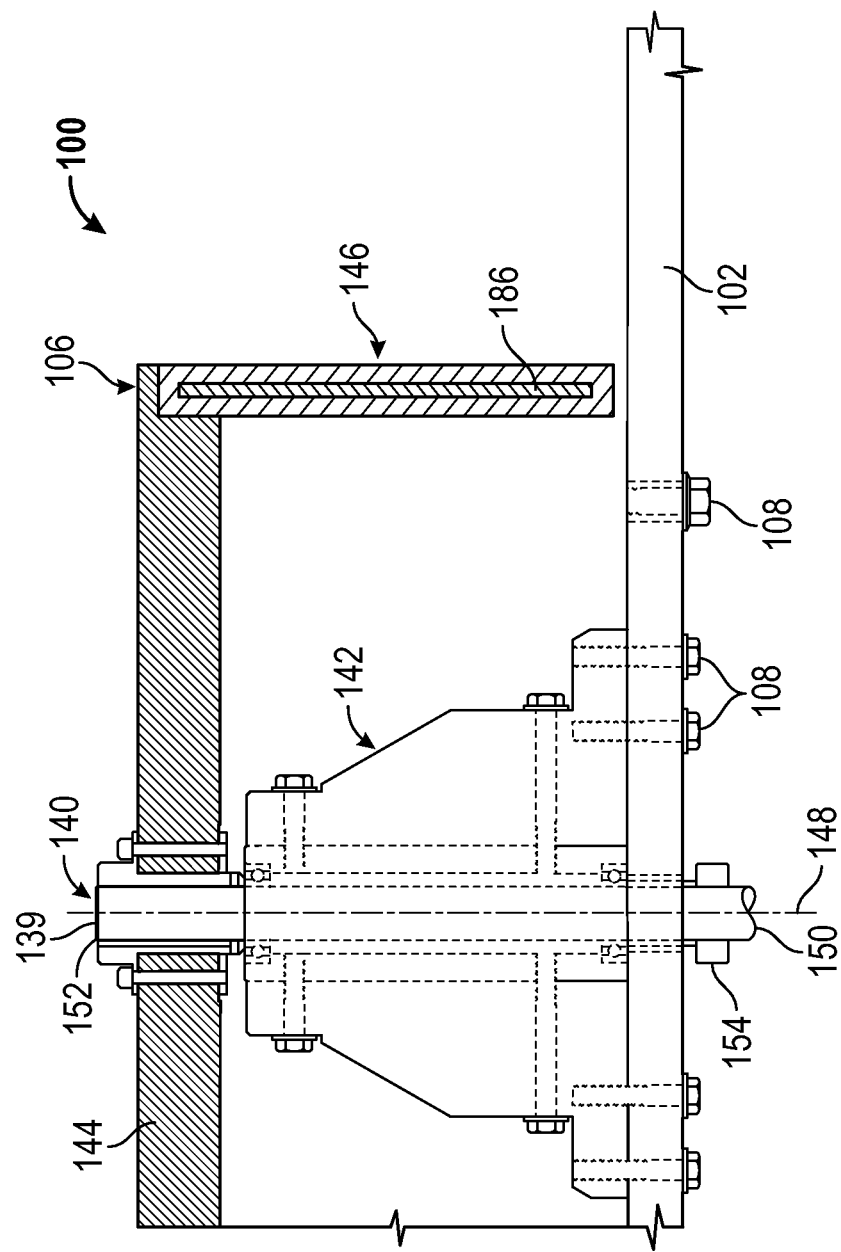
FIG. 9 is a partial cross sectional view of a drum assembly according to the inventive concepts disclosed herein.
Figure 10:
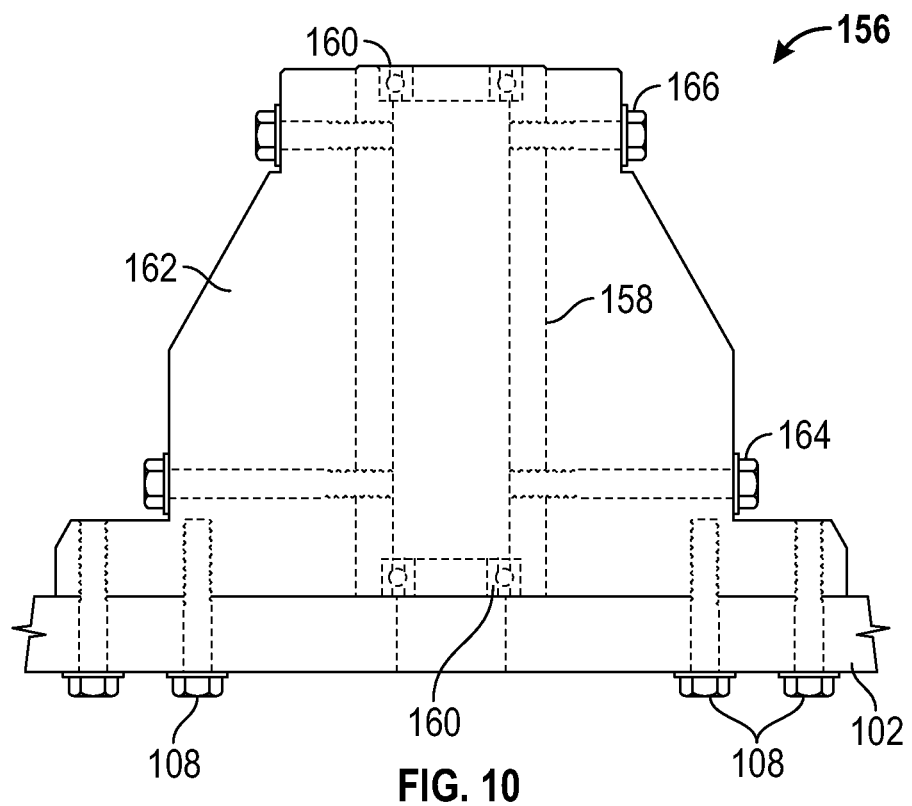
FIG. 10 is a plan view of a shaft support assembly according to the inventive concepts disclosed herein.
Figure 11:
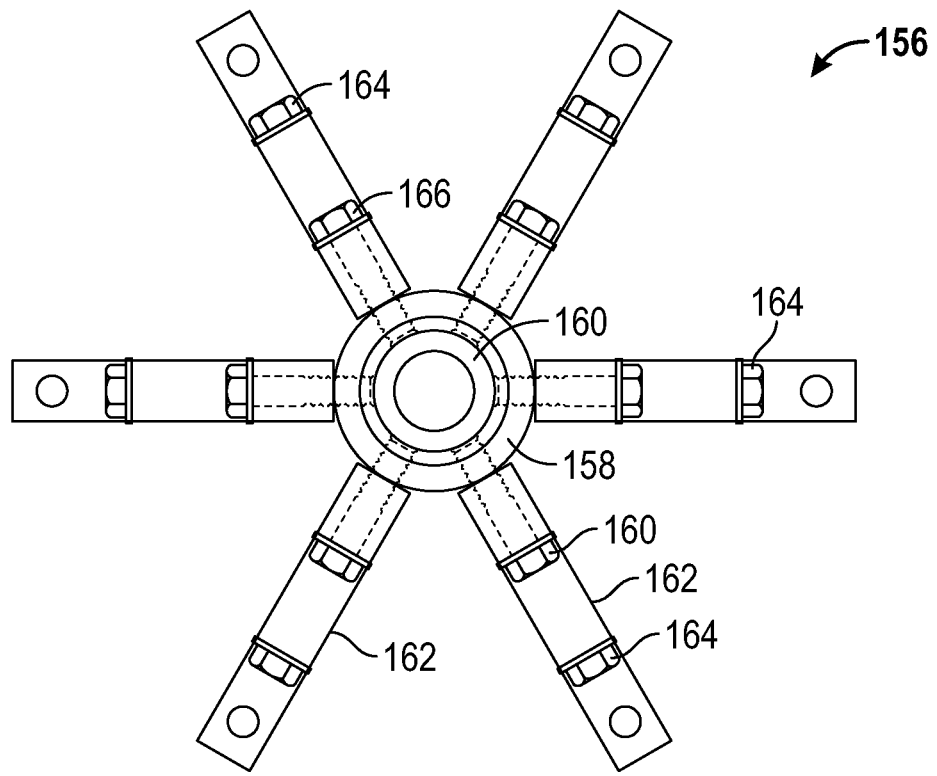
FIG. 11 is a top plan view of the shaft support assembly of FIG. 10.
Figure 12:
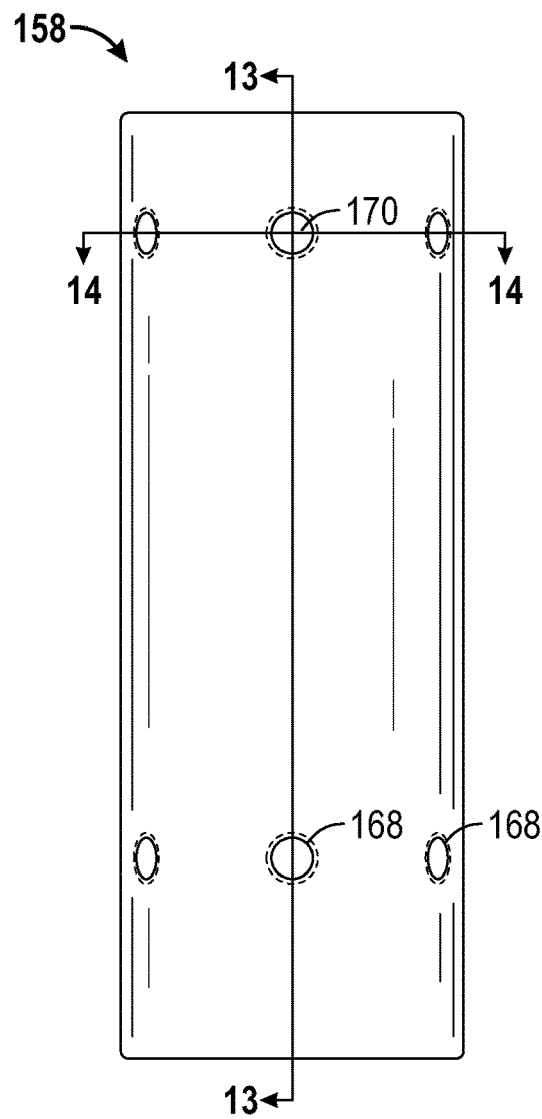
FIG. 12 is a plan view of a shaft support tube according to the inventive concepts disclosed herein.
Figure 13:
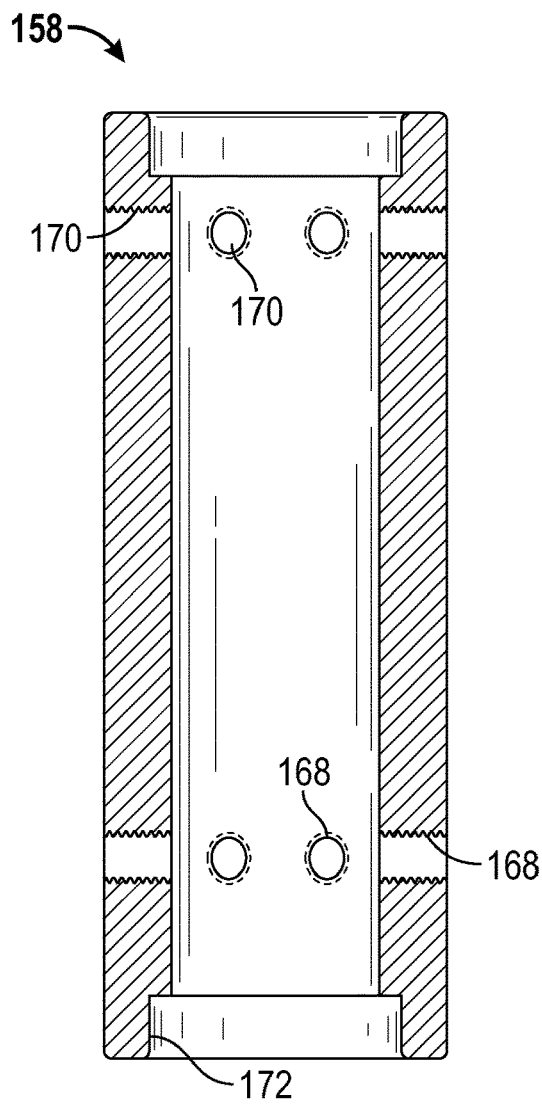
FIG. 13 is a cross-sectional view along line 13-13 of FIG. 12.
Figure 14:
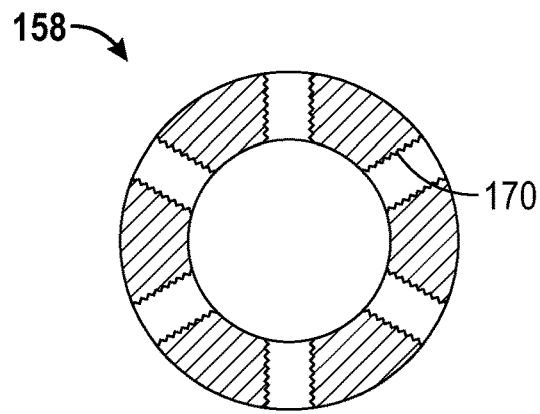
FIG. 14 is a cross-sectional view along line 14-14 of FIG. 12.

Referring now to FIG. 9, the drum assembly 106 may extend substantially vertically from the base plate 102. The drum assembly 106 may have a motive source 139, which is shown and described herein as including a shaft 140, a shaft housing 142, a hub 144, and a drum 146. The motive source 139 can be implemented in other manners as well.

The shaft 140 may have a central axis 148, and may extend substantially perpendicularly to the base plate 102 and through the center 112 of the base plate 102. An end 150 of the shaft or motive source 139 may extend partially below the surface 110 of the base plate 102 and an end 152 of the shaft 140 may extend partially above the surface 110 of the base plate 102 and may be connected to the hub 144, for example. It is to be understood, however, that in some exemplary embodiments of the inventive concepts disclosed herein, the end 150 of the shaft 140 may not extend below the surface 110 of the base plate 102.

The shaft 140 may be attached to the base plate 102 in any conventional manner, such as by being retained by a shaft collar 154, for example. The shaft 140 can be substantially cylindrical in shape and can be made from any suitable material having sufficient strength and durability, and desirably non-conductive and/or non-ferrous materials to limit the potential of eddy currents being induced within the generator 100 can be used. The end 152 of the shaft 140 may connect to the hub 144 using any suitable arrangement, such as welds, joints, brackets, gussets, bolts, clamps, and combinations thereof, for example. Alternatively, the shaft 140 and the hub 144 may be formed as a unitary body, for example.

Referring now to FIGS. 10-14, the shaft 140 can be housed inside a shaft housing 156, which may be mounted onto the base plate 102. The shaft housing 156 may comprise a bearing tube 158, shaft bearings 160, one or more gusset 162, one or more long gusset bolts 164, and one or more short gusset bolts 166. The shaft housing 156 is desirably mounted onto the base plate 102 via base bolts 108, such that the shaft housing 156 is substantially centered over the central aperture 114 of the base plate 102, and the shaft 140 extends through the central aperture 114 of the base plate 102. The bearing tube 158 can be substantially cylindrical in shape, and may have a first row of apertures 168 and a second vertically offset set of apertures 170 cut or otherwise formed therethrough, for example. The apertures 168 and 170 may have threads formed into them and may be adapted to receive long gusset bolts 164 and short gusset bolts 166 therein respectively. The apertures 168 and 170 can be substantially perpendicular to the longitudinal axis of the bearing tube 158.

The bearing tube 158 may also have two or more annular recesses 172 formed in the bottom and top end thereof. The two or more annular recesses 172 can be adapted to receive and retain annular shaft bearings 160 therein. The shaft bearings 160 can cooperate with the bearing tube 158 to rotatably secure and house the shaft 140, and may function to guide and ensure smooth rotation of the shaft 140 about its central axis 148. The apertures 170 can be diametrically opposed along the cylindrical surface of the bearing tube 158. The bearing tube 158 may be constructed of a thermoset plastic laminate material such as a material of the type sold under the name Garolite G-10, but acrylic plastics such as Plexiglas™, epoxy resins, or any material of suitable strength and durability, and desirably non-conductive and/or non-ferrous materials to limit the potential of eddy currents being induced within the generator 100 may also be used in some exemplary embodiments of the inventive concepts disclosed herein.

Figure 15:
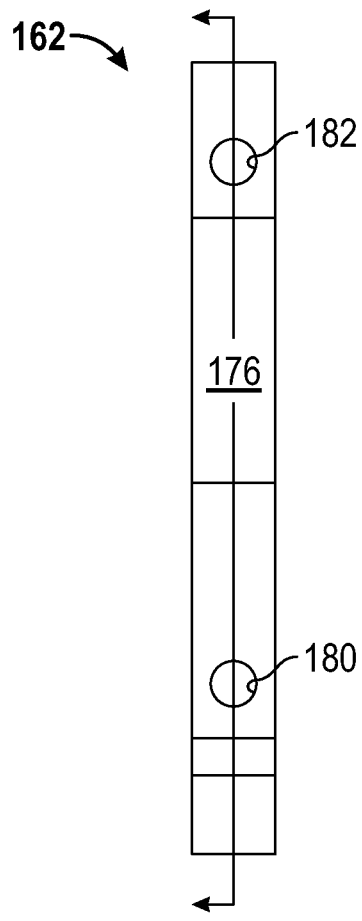
FIG. 15 is an end view of a gusset according to the inventive concepts disclosed herein.
Figure 16:
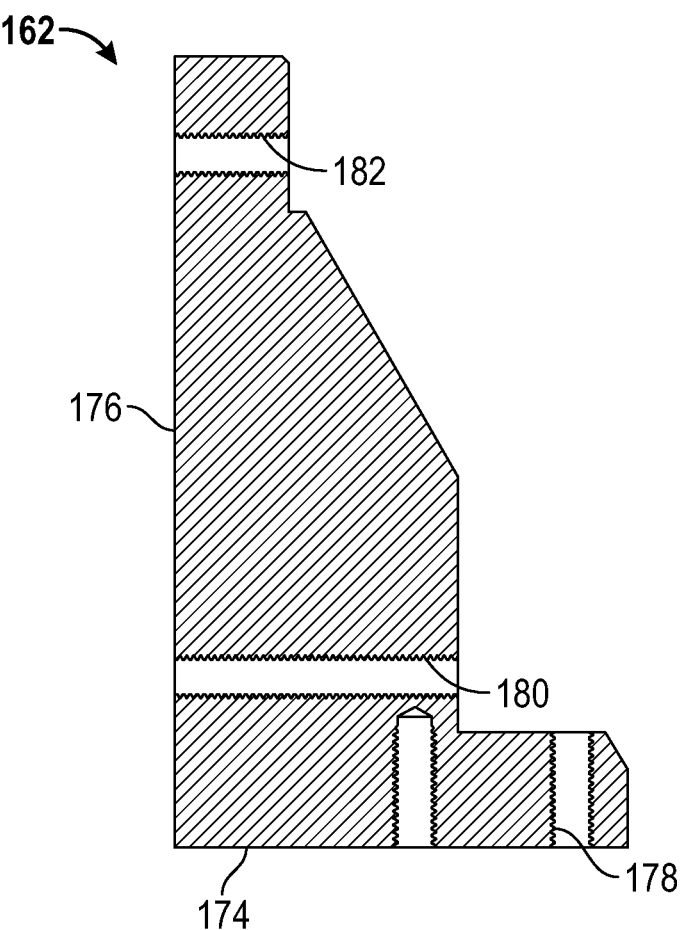
FIG. 16 is a cross-sectional view along line 16-16 of FIG. 15.
Figure 17:
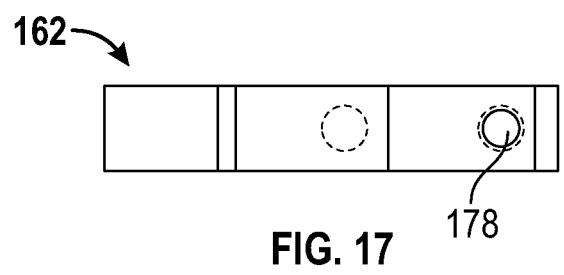
FIG. 17 is a top view of the gusset of FIG. 15.

Referring now to FIGS. 15-17, an exemplary embodiment of the gusset 162 can have a bottom surface 174 and a bearing tube surface 176 substantially perpendicular to the surface 110. The bottom surface 174 may have one or more apertures 178 formed therein. The one or more apertures 178 may have threads formed therein, and may be adapted to receive base bolts 134 in order to mount the gusset 162 onto the base plate 102, for example. The bearing tube surface 176 can have two or more apertures 180 and 182 cut or otherwise formed therein. The apertures 180 and 182 can be adapted to receive one or more long gusset bolts 164 and one or more short gusset bolts 166 respectively therethrough in order to secure the bearing tube 158 to the gusset 162. Several gussets 162 can be secured to the bearing tube 158 in order for the bearing tube surfaces 176 of the gussets 162 to support the bearing tube 158 in a substantially perpendicular orientation relative to the base plate 102.

The number of gussets 162 mounted to the bearing tube 158 can be as low as one, and can be any odd or even number depending on the sizes of the bearing tube 158 and gussets 162. When an even number of gussets 162 is used, the gussets 162 may be mounted on the bearing tube 158 in diametrically opposed locations, for example. When an odd number of gussets 162 is used, the gussets 162 may be disposed at regular intervals along the cylindrical surface of bearing tube 158, such that the distances between any two gussets 162 is substantially the same as the distance between any other two gussets 162, for example. Alternatively, the one or more gusset 162 can be omitted and the bearing tube 158 can be secured to the base plate 102 by any conventional means such as welds, brackets, shims, welds, supports, and combinations thereof, for example. The bearing tube 158 may be welded to the base plate 102 for example. Alternatively, the bearing tube 158 and the base plate 102 may be formed as a unitary body in some exemplary embodiments of the inventive concepts disclosed herein.

The one or more gusset 162 may be constructed of a thermoset plastic laminate material such as the type of material sold under the name Garolite G-10, but acrylic plastics such as Plexiglas™, epoxy resin, or any material of suitable strength and durability, and desirably non-conductive and/or non-ferrous materials to limit the potential of eddy currents being induced within the generator 100 can be used.

Figure 18:
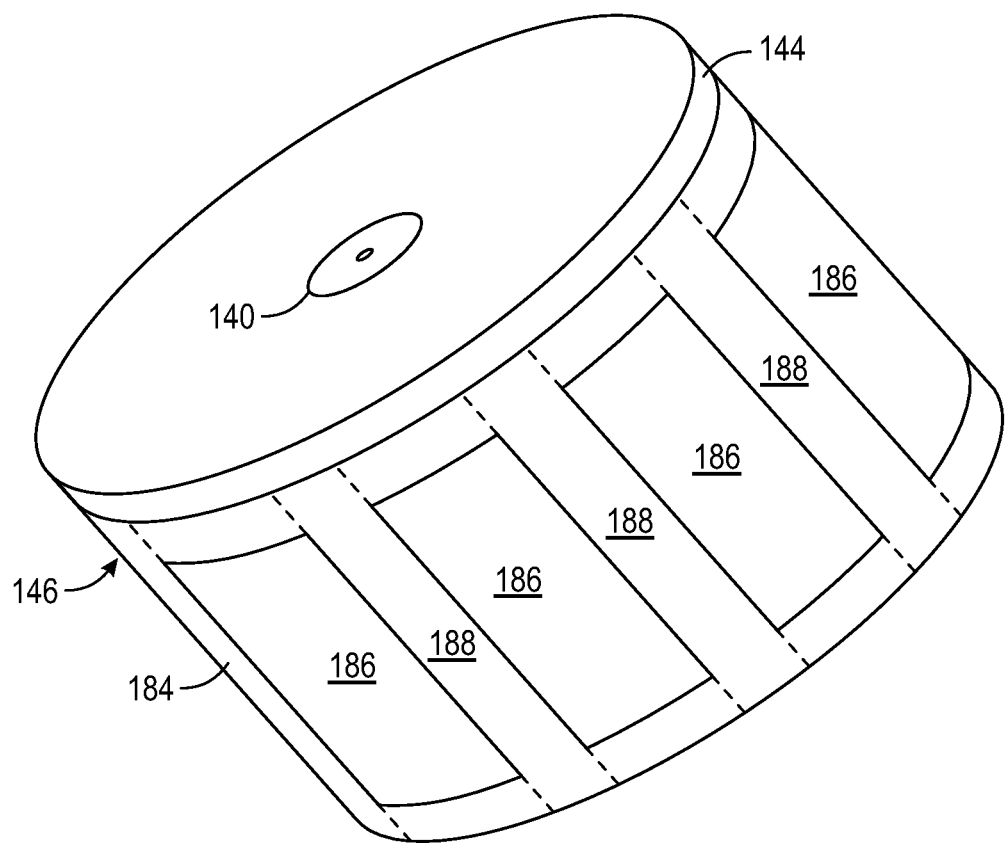
FIG. 18 is a perspective view of a drum according to the inventive concepts disclosed herein.

Referring now to FIG. 18, the hub 144 may be a substantially cylindrical hub 144, or may include one, two, or more spokes (not shown) connecting the shaft 140 and the drum 146. The hub 144 may be substantially parallel to the surface 110 of the base plate 102. The hub 144 connects to the shaft 140. The hub 144 can be made from any suitable material with the desired strength and durability, and desirably non-conductive and/or non-ferrous materials to limit the potential of eddy currents being induced within the generator 100.

The drum 146 may have a substantially cylindrical sidewall 184. The drum 146 may be connected to the hub 144. The drum 146 may be supported by the shaft 140 above the base plate 102 such that the sidewall 184 of the drum 146 is substantially perpendicular to the base plate 102 and adapted to rotate around the center 112 of the base plate 102 when the shaft 140 is rotated about the central axis 148. The drum 146 is sized such that the sidewall 184 is separated from the exposed surfaces 138*a-b* of the one or more magnetic field sources 124*a-b* by the air gap 136. The air gap 136 may be adjusted, such as by slidably adjusting the position of the one or more flux assembly 104 relative to the sidewall 184 via the adjustable mounting bracket 105 (FIG. 1), or via any conventional adjusting mechanism, including but not limited to an adjustment track, for example. It is to be understood that the adjustable mounting bracket 105 (FIG. 1) may allow for adjusting the position of the one or more flux assembly 104 relative to the base plate 102 and/or may maintain the position of the one or more flux assembly 104 substantially stationary relative to the base plate 102 and adjust the position of the magnetic field sources 124*a* and 124*b* of the one or more flux assembly 104 relative to the base plate 102 and the sidewall 184, for example. In other embodiments of the inventive concepts disclosed herein, the position of the one or more flux assembly 104 may be maintained substantially stationary relative to the base plate 102, and the position of the drum assembly 106 or the sidewall 184 may be adjustable, such that the air gap 136 separating the sidewall 184 and the one or more magnetic field sources 124*a-b* may be adjusted as desired, for example. The adjustable mounting bracket 105 may allow three-dimensional adjustability, such that the position of the flux base 122 may be adjusted relative to the sidewall 184 in three-dimensions, for example, such as adjusting the size of the air gap 136, adjusting the elevation of the flux base 122 relative to the base plate 102, adjusting the tilt, yaw, lean, angle, and orientation of the flux base 122 relative to the base plate 102, and any desired combination thereof.

The sidewall 184 may have one or more magnetic field permeable segments 186 alternating with one or more magnetic field impermeable segments 188. The alternating one or more magnetic field permeable segments 186 and one or more magnetic field impermeable segments 188 may be implemented by embedding, incorporating, or otherwise attaching one or more segments or strips of magnetic field permeable material into the sidewall 184, such that the one or more segments or strips of magnetic field permeable material are oriented substantially perpendicularly to the surface 110 of the base plate 102. The alternating one or more magnetic field permeable segments 186 and one or more magnetic field impermeable segments 188 may be imbedded into the sidewall 184 in an effort to maximize the magnetic conductance across the air gap 136. In effect, movement of the alternating one or more magnetic field permeable segments 186 and one or more magnetic field impermeable segments 188 relative to the one or more flux assembly 104 alternatively closes and enlarges the air gap 136 to create flux differentials which induces current in the coil 126. The one or more segments of strips of magnetic field permeable material may be constructed as a laminated steel insert, for example, and may have a width substantially equal to the width of the exposed surfaces 138*a* and 138*b* of the first magnetic field source 124*a* and the second magnetic field source 124*b*. It is to be understood that in some exemplary embodiments of the inventive concepts disclosed herein, the one or more segments or strips of magnetic field permeable material may have a width that is greater than, or lesser than the width of the exposed surfaces 138*a* and 138*b*. In some exemplary embodiments a first magnetic field permeable segment 186 may have a first width and length and a second magnetic field permeable segment 186 may have a second width and length. The first width may be substantially equal to, or different from the second width, and the second length may be substantially equal to, or different from the second length, for example.

The one or more magnetic field permeable segments 186 are separated by one or more magnetic field impermeable segments 188 which may be constructed of any suitable magnetic field impermeable material, such as plastics or Garolite G-10, for example. The one or more magnetic field impermeable segments 188 may have a width that is substantially equal to, or different from the width of the one or more magnetic field permeable segments 186 as will be appreciated by persons of ordinary skill in the art. In some exemplary embodiments a first magnetic field impermeable segment 188 may have a first width and length and a second magnetic field impermeable segment 188 may have a second width and length. The first width may be substantially equal to, or different from the second width, and the second length may be substantially equal to, or different from the second length, for example.

The number, size, length, width, and orientation of the one or more magnetic permeable segments 186 and the one or more magnetic impermeable segments 188 may be varied depending on the operational variables of the generator 100. For example, in an embodiment utilizing six flux assemblies 104, eighteen alternating magnetic permeable segments 186 and eighteen magnetic impermeable segments 188 may be implemented. Further, the number and size of the one or more magnetic permeable segments 186 and the one or more magnetic impermeable segments 188 may be coordinated with the number and arrangement of the one or more flux assemblies 104, such that cogging or start up torque exerted onto the drum 146 by the first magnetic field source 124*a* and the second magnetic field source 124*b* is minimized or balanced, such that it substantially cancels out across the drum 146, for example.

Figure 19:
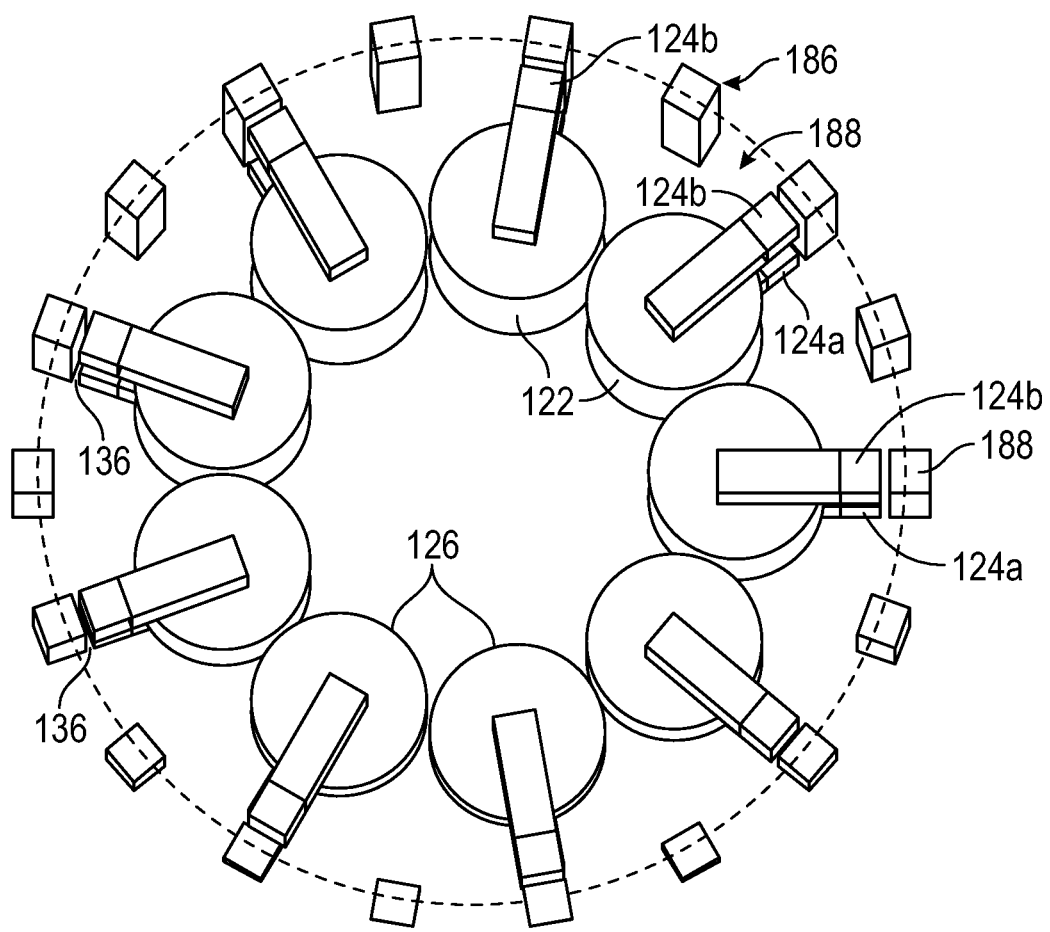
FIG. 19 is a perspective view diagram of a generator according to the inventive concepts disclosed herein.
Figure 20:
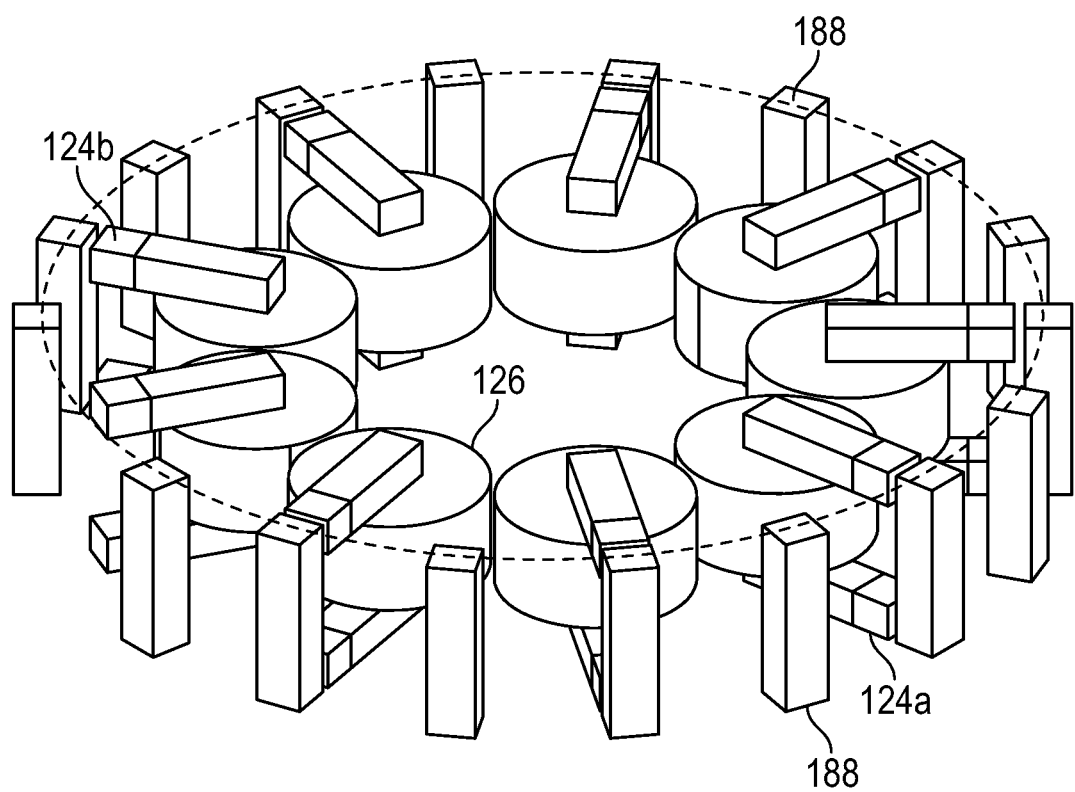
FIG. 20 is another perspective view diagram of the generator of FIG. 19.

Referring now to FIGS. 19-20, in operation, a generator 100 according to the inventive concepts disclosed herein may generate electricity as follows: the shaft 140 may be connected to any suitable source of mechanical energy such as a propeller driven by wind, or a turbine driven by steam, for example. In any event, mechanical energy may be provided to rotate the shaft 140, which in turn rotates the cylindrical sidewall 184 of the drum 146 and causes the one or more magnetic permeable segments 186 and the one or more magnetic impermeable segments 188 to move through a predetermined travel path, which in this example may be a circularly shaped travel path. The alternating one or more magnetic field permeable segments 186 and one or more magnetic field impermeable segments 188 of the sidewall 184 may be alternatively disposed adjacent to the exposed surface 138*a* of the first magnetic field source 124*a* and the exposed surface 138*b* of the second magnetic field source 124*b*, such that the sidewall 184 is separated from the first and second magnetic field sources 124*a-b* by the air gap 136. The one or more magnetic field permeable segments 186 shunt the magnetic field which allows a relatively stronger magnetic field to reach the first magnetic field source 124*a* and/or the second magnetic field source 124*b*, and the one or more magnetic field impermeable segments 188 do not shunt the magnetic field, such that a relatively weaker magnetic field reaches the first magnetic field source 124*a* and/or the second magnetic field source 124*b*. The magnetic field source 124 may create a continual flux, however, the movement of the one or more magnetic field permeable segments 186 and the one or more magnetic field impermeable segments 188 across the first magnetic field source 124*a* and/or the second magnetic field source 124*b* creates a differential flux within the coil 126, which induces electrical current into the coil 126. The electrical current can then be allowed to flow through an external circuit, and may have its output optimized for its intended use by devices such as rectifiers, inverters, and transformers, for usable voltage and frequency as desired.

The mechanical energy used to rotate the shaft 140 of the generator 100 can be supplied from any suitable source of mechanical energy such as, but expressly not limited to: a wind turbine, a water turbine, a steam turbine, an internal combustion engine, a steam engine, a coal turbine, or a water wheel, for example. The operative connection between the shaft 140 of the generator 100 and the source of mechanical energy may be a direct mechanical connection, or alternatively a gearbox, a speed control assembly, or a brake assembly may be used to connect the source of mechanical energy to the shaft 140.

It is to be understood that in some exemplary embodiments of the inventive concepts disclosed herein, a source of mechanical energy may not be connected to the shaft 140, but may be connected to the hub 144 instead, such that rotational motion may be imparted to the drum 146 via the hub 148 as will be understood by persons of ordinary skill in the art having the benefit of the instant disclosure. In this instance, the hub 144 is the motive source 139. As will be understood by persons of ordinary skill in the art having the benefit of the instant disclosure, any desired mechanism or means may be implemented as the motive source 139, provided that such motive source 139 is capable of moving the magnetic field permeable segments 186 and the magnetic field impermeable segments 188 across the magnetic field of first magnetic field source 124*a* and/or the second magnetic field source 124*b* according to the inventive concepts disclosed herein.

It should also be understood that, because of the nature of the design and the ability to reconfigure embodiments of the generator 100 according to the inventive concepts disclosed herein such that the drum 146 has multiple alternating segments 186 and 188 and multiple flux assemblies 104, the generator 100 may be adapted for, but not limited to, low rpm environments, such as wind or water driven turbines, as more than one magnetic field change can be induced in a single rotation of the drum 146. Further, a generator 100 according to the inventive concepts disclosed herein may be implemented in high rpm environments, in medium rpm environments, or in varying rpm environments, and combinations thereof, for example.

It is to be understood that the dimensions given and described herein may not be suitable for a commercial embodiment of a generator 100 according to the inventive concepts disclosed herein. A commercial embodiment of a generator 100 built using the inventive concepts disclosed herein may be much larger in dimensions, and may likely include a large number of flux assemblies 104.

It is to be further understood that while permanent magnets have been described as the magnetic field source, electromagnets, combinations of permanent magnets and electromagnets, or any other suitable magnetic field source may also be used with the inventive concepts disclosed herein without departing from the scope and spirit thereof.

Figure 21:
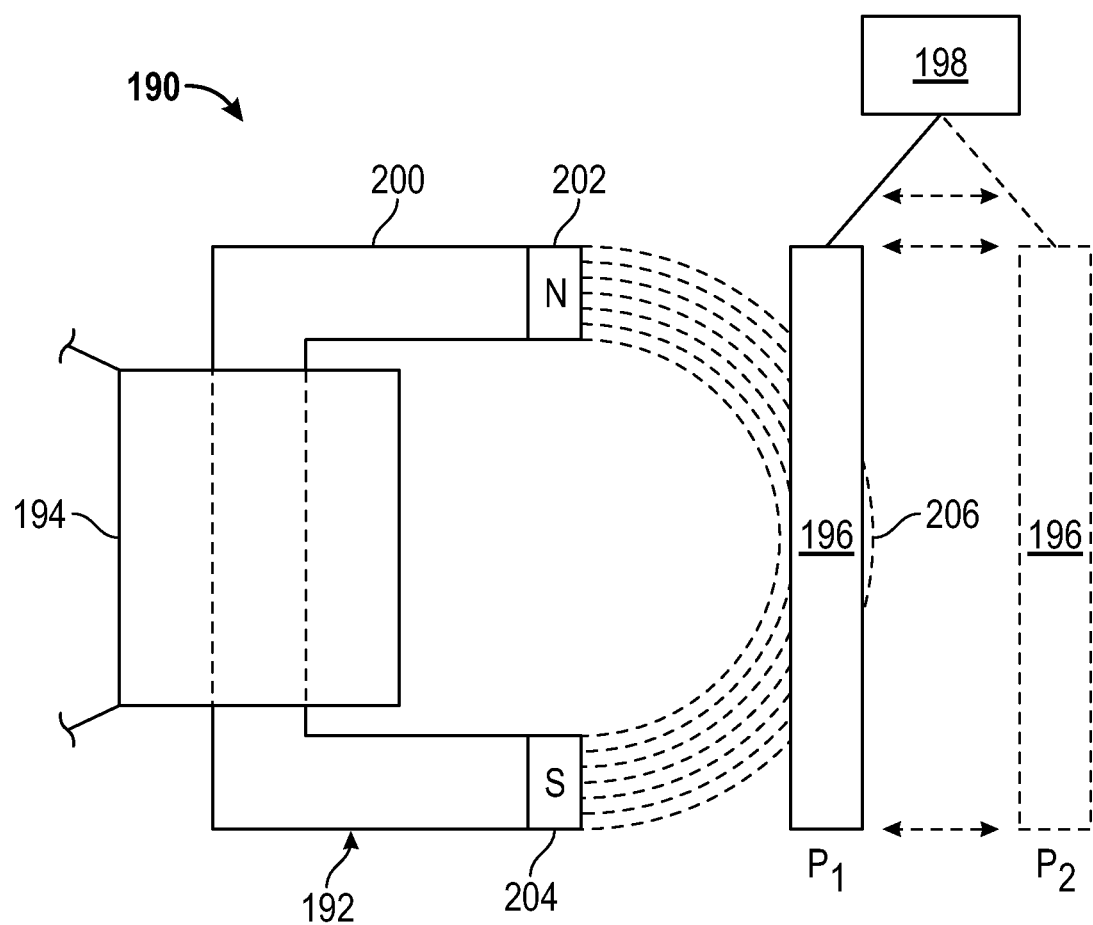
FIG. 21 is a diagram of an exemplary embodiment of an electromagnetic generating transformer according to the inventive concepts disclosed herein.

Referring now to FIG. 21, shown therein is an exemplary embodiment of an electromagnetic generating transformer 190 according to the inventive concepts disclosed herein. The electromagnetic generating transformer 190 includes one or more flux assembly 192, a conductor 194, a shunt 196, and a motive source 198.

The one or more flux assembly 192 has one or more magnetic field source 200 having a magnetic field and at least one positive pole 202 and at least one negative pole 204 and a magnetic field passing in a path 206 between the positive pole 202 and the negative pole 204.

It is to be understood that while the magnetic field source 200 is shown as a horseshoe magnet, the magnetic field source may be have any desired shape, including but not limited to bar, horseshoe, ring, rod, rectangle, irregular, or combinations thereof. The magnetic field source 200 may be a permanent-magnet type magnetic field source 200, or an electromagnetic-type magnetic field source 200. In some exemplary embodiments, the magnetic field source 200 may have multiple positive poles 202 and/or multiple negative poles 204. Further, the magnetic field of the magnetic field source 200 may have any desired strength.

The path 206 may have any desired shape and size and may be guided by the magnetic field source 200, provided that the shunt 196 may be at least partially or substantially completely positioned in the path 206 by the motive source 198 as will be described below.

The conductor 194 is magnetically coupled with the one or more magnetic field source 200, the magnetic field source 200 and the conductor 194 being fixed or substantially fixed relative to one another (e.g., the conductor 194 and the magnetic field source 200 do not move relative to one another, although the conductor 194 and the magnetic field source 200 may move relative to another object). The conductor 194 may be implemented as any desired inductive conductor into which a current may be induced by a magnetic field, such as wires, metals, soft magnetic materials, coils, windings, magnetic alloys, magnetic metals, or combinations thereof, for example. While the conductor 194 is shown as being positioned about a portion of the magnetic field source 200, in some exemplary embodiments the conductor 194 may be separated a distance from the magnetic field source 200 provided that the conductor 194 is magnetically coupled with the magnetic field source 200 (e.g., at least a portion of the conductor 194 is positioned in the magnetic field of the magnetic field source 200). For example, in some embodiments the conductor 194 may be at least partially or substantially completely positioned in the path 206, as will be appreciated by persons of ordinary skill in the art having the benefit of the instant disclosure.

The shunt 196 can be implemented as any material, object, member, or body, which may be moved between the primary position P1 and the secondary position P2, and which has a magnetic permeability higher than the magnetic permeability of air or empty space, such that the strength of the magnetic field passing between the positive pole 202 and the negative pole 204 varies when the shunt 196 is moved between the primary position P1 and the secondary position P2 and/or into the path 206, for example.

The shunt 196 may have any desired dimensions and shape, provided that the shunt 196 is at least partially or substantially completely positionable in the path 206 by the motive source 198, for example. The shunt 196 may be at least partially or substantially completely positionable in the path 206 in the primary position P1 and/or in the secondary position P2. For example, in some embodiments, the shunt 196 may be partially positioned in the path 206 when the shunt 196 is in the primary position P1, and may be substantially completely positioned in the path 206 when the shunt 196 is in the secondary position P2, or vice versa. As another example, the shunt 196 may be at least partially positioned in the path 206 to a first degree when the shunt 196 is in the primary position P1, and may be at least partially positioned in the path 206 to a second degree when the shunt 196 is in the secondary position P2, with the first degree and the second degree being different from one another, such that the strength of the magnetic field passing between the positive pole 202 and the negative pole 204 varies when the shunt 196 is moved between the primary position P1 and the secondary position P2. In some exemplary embodiments, more than one shunt 196 may be implemented, such as two shunts 196 (e.g., moved by the same motive source 198, or by two or more motive sources 198), more than two shunts 196, or a plurality of shunts 196.

The motive source 198 is operably coupled with the shunt 196 and configured to move the shunt 196 between the primary position P1 and the secondary position P2, such that the magnitude of the magnetic field passing between the positive pole 202 and the negative pole 204 varies when the shunt 196 is moved between the primary position P1 and the secondary position P2.

The motive source 198 may be implemented as any desired device or apparatus configured to move the shunt 196 between the primary position P1 and the secondary position P2 in any manner and at any speed and/or frequency, such as by sliding, rotating, reciprocating, pivoting, oscillating, or otherwise moving the shunt 196 between the primary position P1 and the secondary position P2, and combinations thereof.

In some exemplary embodiments, the motive source 198 may be operably coupled with the shunt 196 mechanically, hydraulically, pneumatically, electromagnetically, electrically, fluidly, or in any other desired fashion, so as to move the shunt 196 between the primary position P1 and the secondary position P2. In some exemplary embodiment, the shunt 196 may be brought into contact with the magnetic field source 200 when the shunt 196 is moved in the primary position P1 or in the secondary position P2 by the motive source 198, so that the shunt 196 comes into contact with the positive pole 202 and/or the negative pole 204 of the magnetic field source 200. In some exemplary embodiments, the motive source 198 and the shunt 196 may be formed as a unitary component. Further, in some embodiments, two or more motive sources 198 may be implemented to move a single shunt 196, or two or more shunts 196, for example.

The electromagnetic generating transformer 190 may operate by activating, actuating, or otherwise using the motive source 198 to move the shunt 196 between the primary position P1 and the secondary position P2, so that the strength of the magnetic field passing through the path 206 and/or between the positive pole 202 and the negative pole 204 varies when the shunt 196 is moved between the primary position P1 and the secondary position P2. The frequency of the movement of the shunt 196 between the primary position P1 and the secondary position P2 may be any desired frequency, and the speed of the movement may be any desired speed. The varying magnetic field caused by the movement of the shunt 196 between the primary position P1 and the secondary position P2 induces an electrical current in the conductor 194, which electric current may be allowed to flow through an external circuit. The electric current may be filtered, amplified, conditioned, transformed to direct or alternating current, or otherwise processed as will be appreciated by persons of ordinary skill in the art having the benefit of the instant disclosure. In some exemplary embodiments, the conductor 194 may be electrically coupled with the motive source 198 such that current from the conductor 194 may be used to at least partially power the motive source 198.

The generator(s) described herein with reference to FIGS. 1-20 are exemplary implementations of the electromagnetic generating transformer 190.

Figure 22:
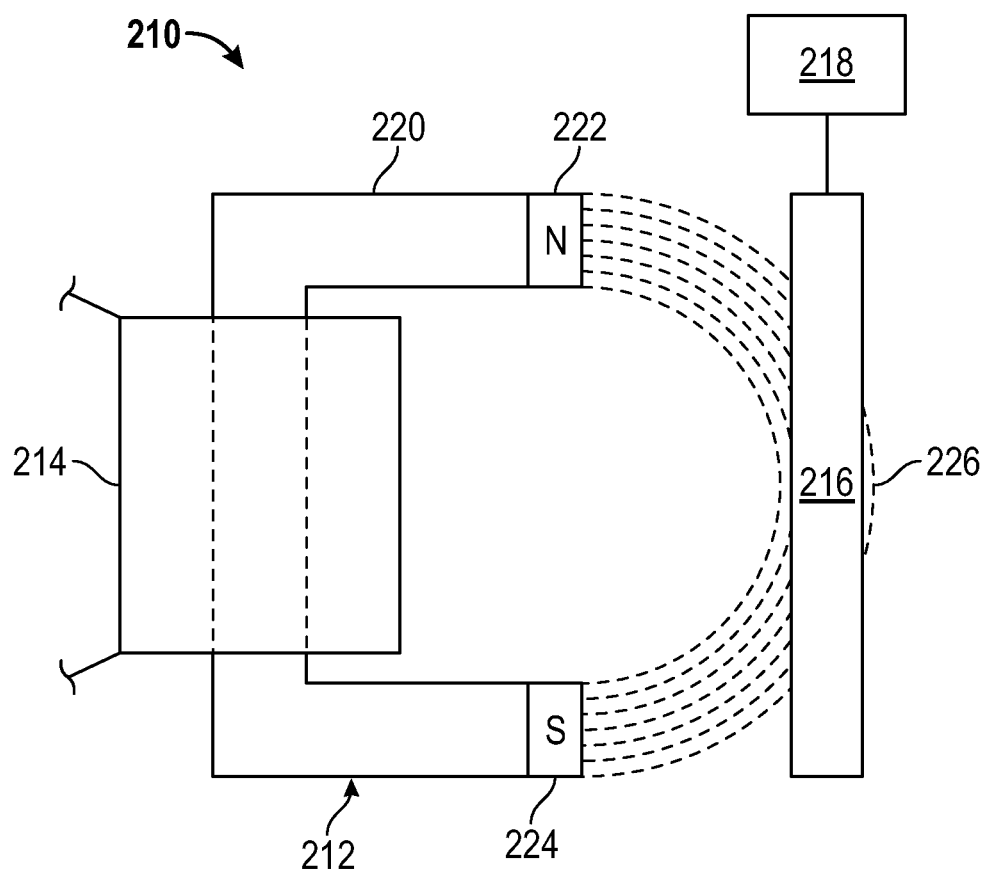
FIG. 22 is a diagram of another exemplary embodiment of an electromagnetic generating transformer according to the inventive concepts disclosed herein.

Referring now to FIG. 22, shown therein is an exemplary embodiment of an electromagnetic generating transformer 210 according to the inventive concepts disclosed herein. The electromagnetic generating transformer 210 may comprise one or more flux assembly 212, a conductor 214, a shunt 216, and a controller 218.

The flux assembly 212 has one or more magnetic field source 220 having a positive pole 222 and a negative pole 224 and a magnetic field passing in a path 226 between the positive pole 222 and the negative pole 224. The flux assembly 212 may be implemented and may function substantially similarly to the flux assembly 192 as described above.

The magnetic field source 220 may be implemented and may function similarly to the magnetic field source 200, for example.

The conductor 214 is magnetically coupled with the one or more magnetic field source 220. The magnetic field source 220 and the conductor 214 are fixed relative to one another. The conductor 214 may be implemented and function substantially similarly to the conductor 194, or differently therefrom, for example.

The shunt 216 is positioned at least partially or substantially completely in the path 226 of the magnetic field, or is otherwise magnetically coupled with the magnetic field source 220, and has an adjustable, switchable, or variable magnetic permeability, which is selectively adjustable between a first magnetic permeability and a second magnetic permeability by the controller 218, for example. The first magnetic permeability and the second magnetic permeability are different from one another, so that the strength of the magnetic field passing between the positive pole 222 and the negative pole 224 varies when the magnetic permeability of the shunt 216 is switched. The shunt 216 may be stationary relative to the magnetic field source 220, or may be movable relative to the magnetic field source 220. For example, in some embodiments the shunt 216 may be implemented similarly to the shunt 196 and may be movable between a first position and a second position by a motive source, such as the motive source 198, as will be appreciated by persons of ordinary skill in the art having the benefit of the instant disclosure.

In some exemplary embodiments, the shunt 216 may be in contact with the magnetic field source 220, such as by being in contact with the positive pole 222 and/or the negative pole 224, while in some embodiments, the shunt 216 may be positioned in the path 226 and spaced apart at a distance from the magnetic field source 220.

The controller 218 may be implemented as any suitable device or apparatus configured to influence the magnetic permeability of the shunt 216 to adjust or switch the magnetic permeability of the shunt 216 from the first permeability to the second permeability so that the strength of the magnetic field passing between the positive pole 222 and the negative pole 224 and/or the path 226 varies. In some exemplary embodiments, the controller 218 may switch the magnetic permeability of the shunt 216 by electrical, electromagnetic, thermal, acoustic, mechanical, pneumatic, hydraulic, or any other means or forces, as will be readily appreciated by a person of ordinary skill in the art.

For example, the controller 218 may switch the magnetic permeability of the shunt 216 by raising or lowering the temperature of the shunt 216, applying pressure to the shunt 216, removing pressure from the shunt 216, applying electrical current or potential to, or removing electrical current or potential from the shunt 216, applying a magnetic field to, or removing a magnetic field from the shunt 216, applying or removing sound or light energy to the shunt 216, applying or removing mechanical forces (e.g., compressive, twisting, stretching, or combinations thereof) to the shunt 216, supplying or removing a chemical or substance to or from the shunt 216, and any other suitable manner.

In an exemplary embodiment, the shunt 216 may be constructed of or may include a magnetostrictive material, such as cobalt, Terfenol-D, (Ter for terbium, Fe for iron, NOL for Naval Ordnance Laboratory, and D for dysprosium), amorphous magnetic metals or alloys (e.g., the material sold under the trademark Metglas), or combinations thereof, and the controller 218 may apply kinetic or mechanical energy to the shunt 216 to take advantage of the inverse magnetostrictive effect (or the Villari effect) to switch the magnetic permeability of the shunt 216 between the first and second permeability. The Matteucci effect (the creation of a helical anisotropy of the susceptibility of a magnetostrictive material when subjected to a torque) and/or the Wiedemann effect (the twisting of magnetostrictive materials when subjected to a helical magnetic field) may also be utilized by the controller 218 to switch the magnetic permeability of the shunt 216 in some exemplary embodiments.

In some exemplary embodiments, the shunt 216 may be constructed of or may include paramagnetic or superparamagnetic materials, in which case the controller 218 may apply or remove an external magnetic field to the shunt 216 to switch the magnetic permeability of the shunt 216. In some exemplary embodiment, where the shunt 216 may be constructed of or may include high-temperature or low-temperature superconductor materials, and the controller 218 may raise or lower the temperature of the shunt 216 to switch the magnetic permeability of the shunt 216.

The electromagnetic generating transformer 210 may operate as follows. The controller 218 may be operated to change or switch the magnetic permeability of the shunt 216 so that the magnitude of the magnetic field passing between the positive pole 222 and the negative pole 224 varies. The controller 218 may switch the magnetic permeability of the shunt 216 at any desired frequency, for example. The varying magnetic field induces an electrical current in the conductor 214, which electric current may be allowed to flow through an external circuit. The electric current may be filtered, amplified, conditioned, transformed to direct or alternating current, or otherwise processed as will be appreciated by persons of ordinary skill in the art having the benefit of the instant disclosure. In some exemplary embodiments, the conductor 214 may be electrically coupled with the controller 218 such that current from the conductor 214 may be used to at least partially power the controller 218.

Figure 23:
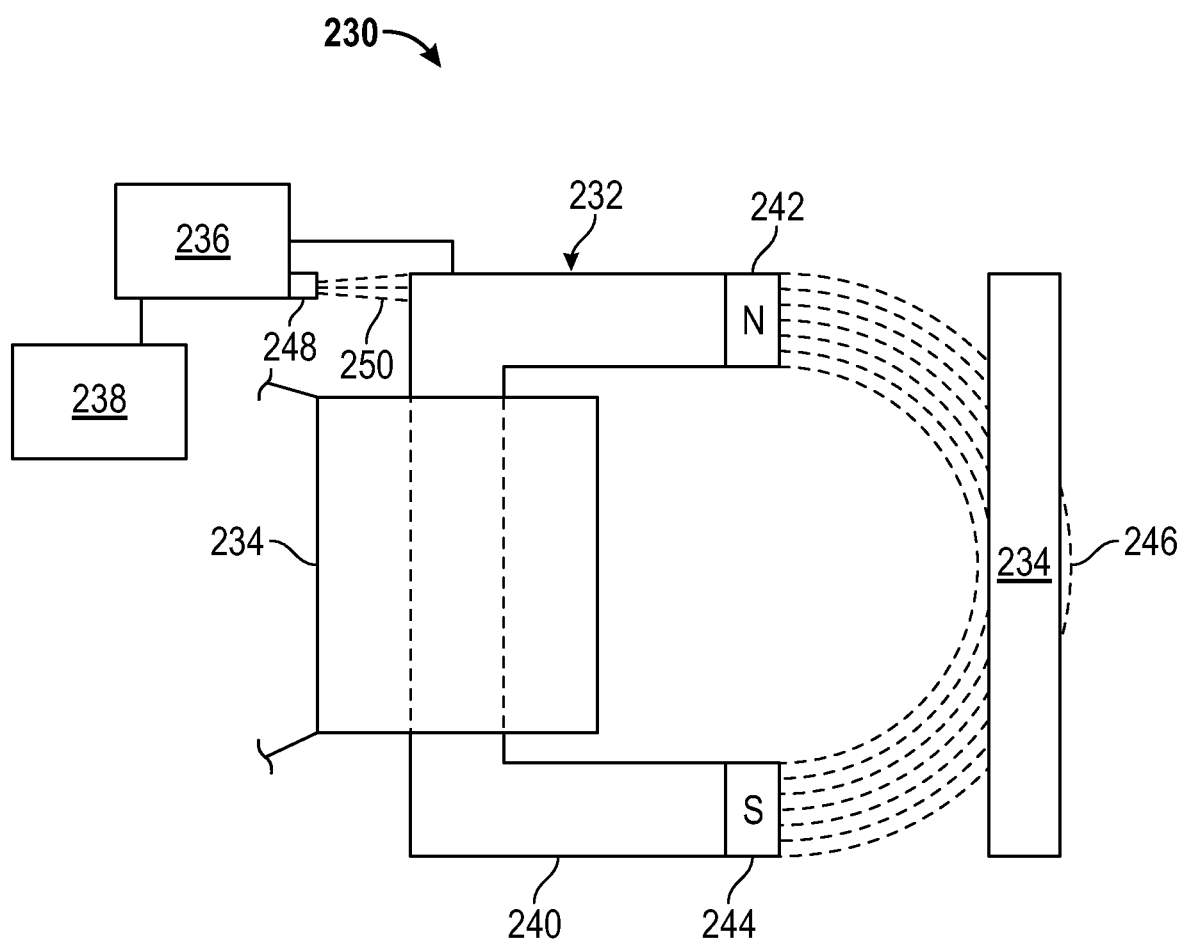
FIG. 23 is a diagram of yet another exemplary embodiment of an electromagnetic generating transformer according to the inventive concepts disclosed herein.

Referring now to FIG. 23, an electromagnetic generating transformer 230 is shown therein. The electromagnetic generating transformer 230 may comprise one or more flux assembly 232, a conductor 234, a magnetic control device 236, and a controller 238.

The one or more flux assembly 232 may have one or more magnetic field source 240 having a positive pole 242 and a negative pole 244 and a magnetic field passing in a path 246 between the positive pole 242 and the negative pole 244.

The magnetic field source 240 may be constructed of any desired magnetic material, such as lanthanide-type materials, permanent magnets, electromagnets, soft magnetic materials, magnetic metals and alloys, and combinations thereof, for example, provided that at least one of the strength and/or polarity of the magnetic field of the magnetic field source 240 can be changed by the magnetic control device 236. For example, the magnetic field source 240 may include or may be constructed of a magnetostrictive material, such as cobalt, Terfenol-D, (Ter for terbium, Fe for iron, NOL for Naval Ordnance Laboratory, and D for dysprosium), amorphous magnetic metals or alloys (e.g., the material sold under the trademark Metglas), or combinations thereof, and the magnetic control device 236 may apply kinetic energy to the magnetic field source 240 to change the strength and/or polarity of its magnetic field. In some exemplary embodiments, the magnetic field source 240 may be constructed of or may include paramagnetic or superparamagnetic materials, in which case the magnetic control device 236 may apply or remove an external magnetic field to the magnetic field source 240 to change the strength and/or polarity of its magnetic field. In some exemplary embodiment, where the magnetic field source 240 includes or is constructed of high-temperature or low-temperature superconductor materials, the magnetic control device 236 may raise or lower the temperature of the magnetic field source 240 (e.g., by pulsing a laser 248 to shine a laser beam 250 thereon) to change the strength and/or polarity of its magnetic field.

The conductor 234 is magnetically coupled with the one or more magnetic field source 240, the magnetic field source 240 and the conductor 243 being fixed relative to one another. In the embodiment shown in FIG. 23, a first conductor 234 is shown as being positioned in the path 246, and a second conductor 234 is shown as being connected with the magnetic field source 240 so as to be in magnetic communication therewith. It is to be understood that in some exemplary embodiments, only a single conductor 234 may be implemented, whether such conductor 234 is at least partially positioned in the path 246, is physically connected with the magnetic field source 240, or is otherwise magnetically coupled with the magnetic field source 240. Further, in some exemplary embodiments more than two, or a plurality of conductors 234 may be implemented.

The magnetic control device 236 is operably coupled with the magnetic field source 240 and with the controller 238. The magnetic control device 236 can use any suitable medium, such as light, heat, sound, or vibration, to change the strength and/or the polarity of the magnetic field of the magnetic source 240, as described above.

The controller 238 is configured to influence the magnetic control device 236 to change at least one of the strength and/or polarity of the magnetic field of the magnetic field source 240 as described above. In some exemplary embodiments, the controller 238 and the magnetic control device 236 may be implemented as a single assembly or component.

The electromagnetic generating transformer 230 may operate as follows. The controller 238 and the magnetic control device 236 may be operated to change at least one of the polarity and/or strength of the magnetic field of the magnetic field source 240, which change may be carried out intermittently, continuously, or cyclically at any desired frequency. The varying magnetic field of the magnetic field source 240 induces current in the conductor 234, which electric current may be allowed to flow through an external circuit. The electric current may be filtered, amplified, conditioned, transformed to direct or alternating current, or otherwise processed as will be appreciated by persons of ordinary skill in the art having the benefit of the instant disclosure. In some exemplary embodiments, the conductor 234 may be electrically coupled with the controller 238 and/or the magnetic control device 236 such that current from the conductor 234 may be used to at least partially power the controller 238 and/or the magnetic control device 236. As it will be appreciated by persons of ordinary skill in the art, changes may be made in the construction and the operation of the various components, elements and assemblies described herein or in the steps or the sequence of steps of the methods described herein without departing from the broad scope of the inventive concepts disclosed herein.

From the above description, it is clear that the inventive concepts disclosed herein is well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and coverage of the inventive concepts disclosed and claimed herein.

The invention is claimed as follows:

1. An electromagnetic generating transformer, comprising:
    at least two flux assemblies with a first flux assembly of the at least two flux assemblies having one or more first magnetic field source and a first coil magnetically coupled with the first magnetic field source, the first magnetic field source being fixed relative to the first coil, and with a second flux assembly of the at least two flux assemblies having one or more second magnetic field source and a second coil magnetically coupled with the second magnetic field source, the second magnetic field source being fixed relative to the second coil, the first flux assembly and the second flux assembly being magnetically isolated from one another, and the first magnetic field source and the second magnetic field source having a positive pole and a negative pole and a magnetic field passing in a path between the positive pole and the negative pole;
    a plurality of shunts mounted on a drum; and
    a motive source operably coupled with the drum having the plurality of shunts mounted thereon and configured to move the plurality of shunts through a circular path into primary positions a first distance away from the respective first and second flux assembly and secondary positions a second distance away from the respective first and second flux assembly, wherein a strength of the magnetic field passing between the positive pole and the negative pole varies when the plurality of shunts are moved between the primary position and the secondary position, wherein a first number and size of the shunts is coordinated with a second number and arrangement of the at least two flux assemblies to minimize or balance cogging or start up torque, the plurality of shunts inducing more than one magnetic field change in a single rotation of the drum.

2. The electromagnetic generating transformer of claim 1, wherein the plurality of shunts are magnetically permeable.

3. The electromagnetic generating transformer of claim 1, wherein the plurality of shunts comprise one or more magnetic field permeable segment alternating with one or more magnetic field impermeable segment.

4. The electromagnetic generating transformer of claim 1, wherein the first flux assembly and the second flux assembly are mounted on a base plate constructed of a material selected from the group consisting of non-conductive materials, non-ferrous materials, and combinations thereof.

* * * * *